(12) United States Patent
Laicher et al.

(10) Patent No.: US 8,572,003 B2
(45) Date of Patent: Oct. 29, 2013

(54) STANDARDIZED COMPUTER SYSTEM TOTAL COST OF OWNERSHIP ASSESSMENTS AND BENCHMARKING

(75) Inventors: Karolin Laicher, Illsfeld (DE); Juergen Jakowski, Rauenberg-Malschenberg (DE); Ralf Strassner, Kolbermoor (DE)

(73) Assignee: SAP AG, Walldorf (DE)

( * ) Notice: Subject to any disclaimer, the term of this patent is extended or adjusted under 35 U.S.C. 154(b) by 2026 days.

(21) Appl. No.: 10/894,652

(22) Filed: Jul. 19, 2004

(65) Prior Publication Data

US 2005/0071285 A1    Mar. 31, 2005

Related U.S. Application Data

(60) Provisional application No. 60/488,626, filed on Jul. 18, 2003.

(51) Int. Cl.
*G06Q 99/00* (2006.01)

(52) U.S. Cl.
USPC .......................... 705/400; 705/1.1; 705/7.11

(58) Field of Classification Search
USPC .................... 705/7, 1, 400, 1.1, 7.11
See application file for complete search history.

(56) References Cited

U.S. PATENT DOCUMENTS

| | | | |
|---|---|---|---|
| 7,020,621 B1 * | 3/2006 | Feria et al. | 705/10 |
| 2002/0082960 A1 * | 6/2002 | Goedken | 705/35 |
| 2002/0082966 A1 * | 6/2002 | O'Brien et al. | 705/36 |
| 2002/0091539 A1 * | 7/2002 | Yin et al. | 705/1 |
| 2002/0194329 A1 * | 12/2002 | Alling | 709/224 |
| 2003/0040823 A1 * | 2/2003 | Harm et al. | 700/97 |
| 2003/0050810 A1 * | 3/2003 | Larkin | 705/7 |
| 2004/0039619 A1 * | 2/2004 | Zarb | 705/7 |

FOREIGN PATENT DOCUMENTS

WO    WO 0126005 A1 *    4/2001

OTHER PUBLICATIONS

"Compaq TCO models & approaches" [online] [retrieved on Jul. 13, 2003]. Retrieved from the internet: http://h18000.www1.hp.com/tco/models.html.
"Compaq TCO snapshort tool" [online] [retrieved on Jul. 13, 2003]. Retrieved from the internet: http://h18000.www1.hp.com/tco/snapshottool.html.
"Compaq TCO assessment services" [online] [retrieved on Jul. 13, 2003]. Retrieved from the internet: http://h18000.www1.hp.com/tco/assessment.html.
"TCO Manager for Distributed Computing" (Apr. 5, 1999) Gartner Group, Inc.
"Deriving Value from Twenty-First Century ERP Applications" (2003) Meta Group, Inc.

* cited by examiner

*Primary Examiner* — Akiba Allen
(74) *Attorney, Agent, or Firm* — Buckley, Maschoff & Talwalkar LLC

(57) ABSTRACT

A method of collecting data used in assessing total cost of owning enterprise computing systems is provided. The method includes distributing, to an enterprise computing system, an electronic data file that identifies, for use by a data extraction tool, predefined data source fields within the enterprising computing system and that relate to costs included in a predefined cost model that defines costs to be included in an analysis of a total cost of owning an enterprise computing system. The method also includes receiving, from the enterprise computing system, cost information aggregated using data extracted using the distributed data file, wherein the cost information is structured in conformity with the predefined cost model. The method further includes using the received cost information to formulate benchmark total cost of ownership cost information that is structured in conformity with the predefined cost model.

18 Claims, 16 Drawing Sheets

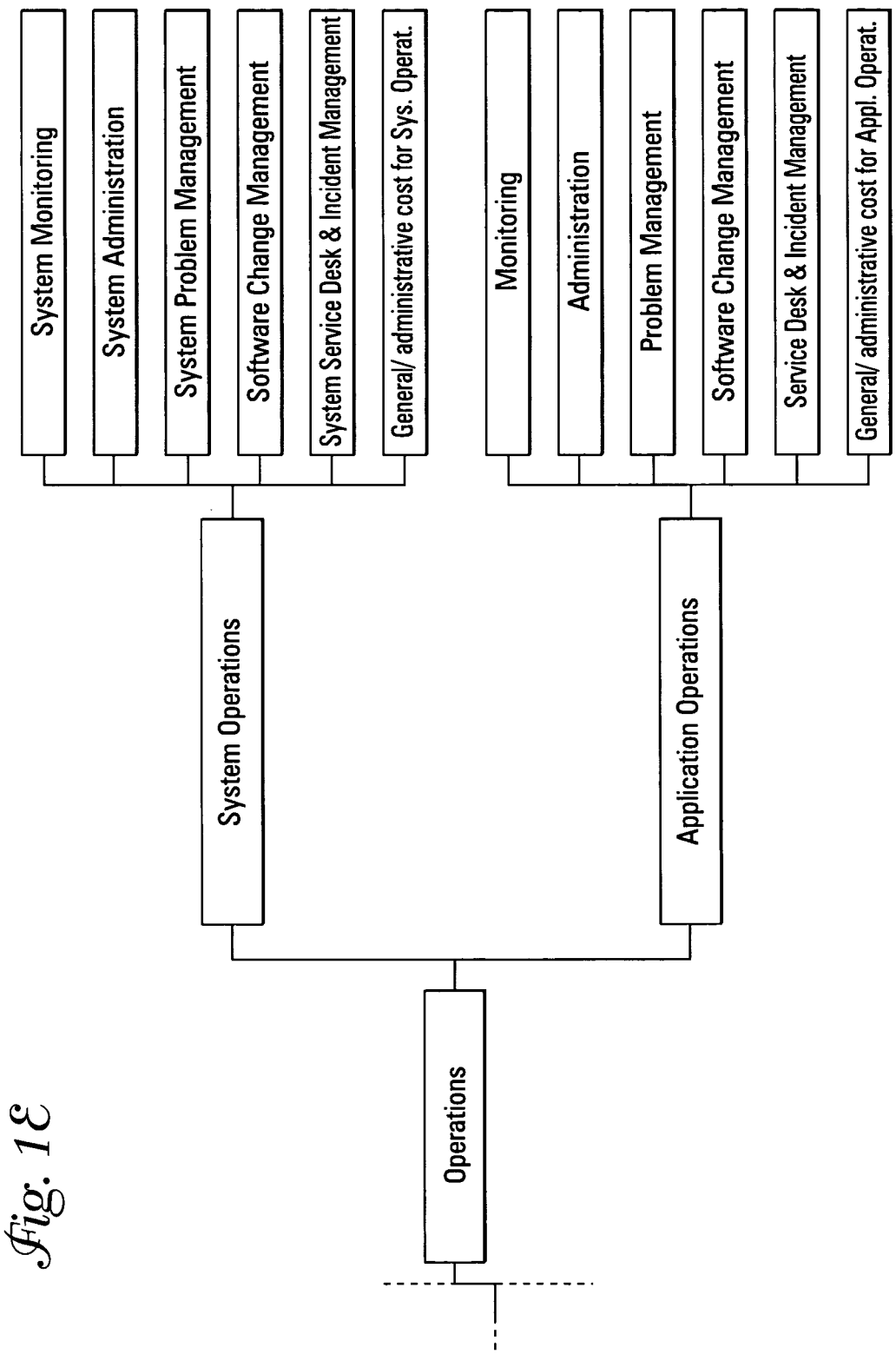
Fig. 1ε

STANDARDIZED COMPUTER SYSTEM TOTAL COST OF OWNERSHIP ASSESSMENTS AND BENCHMARKING

CROSS REFERENCE TO RELATED APPLICATION

This application claims the benefit of U.S. Provisional Patent Application No. 60/488,626, filed Jul. 18, 2003, the contents of which are herein incorporated by reference.

TECHNICAL FIELD

This description relates to assessing the total cost of ownership related to the ownership of a computing system, and more particularly to a new approach for making such assessments, based on an appropriate total cost of ownership (TCO) model.

BACKGROUND

Total cost of ownership (TCO) is a commonly used metric for measuring whether to purchase a computing system for an enterprise, and in determining how to optimize the use, or deployment of, such a computing system. There exist various approaches to assess the TCO for a computing system, offered on the one hand by information technology (IT) analysts (for example, Gartner, Meta, Forrester, etc.), and on the other hand by various software and hardware vendors (Microsoft, Oracle, etc). As such, there has not developed a common standardized understanding about what TCO is all about and what are the reference parameters classifying it. Existing approaches differ in either the time they take into account in determining TCO, in the cost components and elements that are considered relevant to a TCO determination and in the reference parameters needed for data classification. For example, Meta in its TCO approach does not take into account indirect costs, while Gartner within its classical TCO approach does not take into account project costs like system implementation.

In addition, in that IT analysts have a different understanding about what cost components should be considered, IT analysts therefore also have a different understanding of what time frame to consider when investigating TCO. For example, Gartner in its standard TCO benchmark metric only takes into account a one year time frame. Also, while Meta does not take into account indirect costs, Gartner does take such costs into account. Finally regarding the degree of breakdown of the cost components included in a TCO analysis, while Meta only determines a total sum for operations costs with no detailed breakdown, Gartner has a more detailed break-out of cost components included for operations. The reason is that Gartner mainly focuses on operation costs when assessing TCO for a computer system

SUMMARY

Generally, there is provided a standardized methodology for performing assessments of the total cost of owning enterprise computing systems. The methodology uses a standardized predefined model that defines the costs to be included in such an assessment, and also provides the tools for data collection and analysis. The methodology enables useful benchmarking against cost information for similar systems and that conforms to the same standardized predefined model.

In one aspect, a method of collecting data used in assessing total cost of owning enterprise computing systems is provided. The method includes distributing, to an enterprise computing system, an electronic data file that identifies, for use by a data extraction tool, predefined data source fields within the enterprising computing system and that relate to costs included in a predefined cost model that defines costs to be included in an analysis of a total cost of owning an enterprise computing system. The method also includes receiving, from the enterprise computing system, cost information aggregated using data extracted using the distributed data file, wherein the cost information is structured in conformity with the predefined cost model. The method further includes using the received cost information to formulate benchmark total cost of ownership cost information that is structured in conformity with the predefined cost model.

In various implementations, the method may include one or more of the following features. The method may also include receiving cost information compiled by an information technology consultant and including costs associated with an enterprise computing system, and which consultant-provided cost information is structured in conformity with the predefined cost model. The method may also include distributing the electronic data file identifying the predefined data source fields to multiple enterprise computing systems, receiving the aggregated cost information from each of the multiple enterprise computing systems, and using the aggregated cost information received from each of the multiple enterprise computing system in formulating the benchmark cost information.

Multiple different benchmark cost information may be formulated for enterprising computing systems having a different predefined value for a predefined characteristic of enterprise computing system, or in other words, which belong to a common cluster of systems. The predefined characteristic may be a size category of an enterprise in which the enterprise computing system is implemented or an industry type category for an enterprise in which the enterprise computing system is implemented.

The method may also include electronically distributing the determined benchmark cost information to an enterprise computing system. In such a case, the enterprise computing system to which the benchmark cost information is distributed may be configured to aggregate cost information related to its total costs of ownership in conformity with the predefined cost model. Also, the enterprise computing system to which the benchmark cost information is distributed may be further configured to provide a comparison of its aggregated total cost of ownership cost information with distributed benchmark cost information received by the enterprise computing system.

In another aspect, a method is provided of supporting an assessment of a total cost of owning an enterprise computing system. The method includes receiving total cost of ownership cost information relating to enterprise computing systems, wherein the cost information for each such enterprise computing system is structured in conformity with a predefined cost model that defines costs to be included in an analysis of a total cost of owning an enterprise computing system. The method also includes using the received cost information to formulate benchmark total cost of ownership cost information that is structured in conformity with the predefined cost model. The method also includes distributing to an enterprise computing system 1) a total cost of ownership cost analysis tool that is designed in conformity with the predefined cost model and that is used to perform a local analysis of the total cost of ownership for the enterprise computing system to which the cost analysis tool is distributed, and 2) the formulated benchmark total cost of ownership cost information for use in the local total cost of ownership analysis.

In various implementations, the method may include one or more of the following features. The receiving of the cost information is accomplished at least in part by 1) distributing, to an enterprise computing system, an electronic data file that identifies, for use by a data extraction tool, predefined data source fields within the enterprising computing system and that relate to costs included in the predefined cost model; and 2) receiving, from the enterprise computing system, cost information aggregated using data extracted using the distributed data file, wherein the cost information is structured in conformity with the predefined cost model.

Again, multiple different benchmark cost information may be formulated for enterprising computing systems having a different predefined value for a predefined characteristic of enterprise computing system. The predefined characteristic may be a size category of an enterprise in which the enterprise computing system is implemented, and may be industry type category for an enterprise in which the enterprise computing system is implemented. The distribution of the determined benchmark cost information may be accomplished by electronically distributing the determined benchmark cost information to an enterprise computing system.

In addition, the enterprise computing system to which the benchmark cost information is distributed may be configured to aggregate cost information related to its total costs of ownership in conformity with the predefined cost model. Also, the enterprise computing system to which the benchmark cost information is distributed may be further configured to provide a comparison of its aggregated total cost of ownership cost information with distributed benchmark cost information received by the enterprise computing system. The receiving of the cost information may be accomplished at least in part by receiving cost information compiled by a information technology consultant and including costs associated with an enterprise computing system, and which consultant-provided cost information is structured in conformity with the predefined cost model.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 1A-1I are diagrams illustrating a standardized cost structure for the total cost of owning an enterprise computing system.

Like reference symbols in the various drawings indicate like elements.

DETAILED DESCRIPTION

Figure 1A:
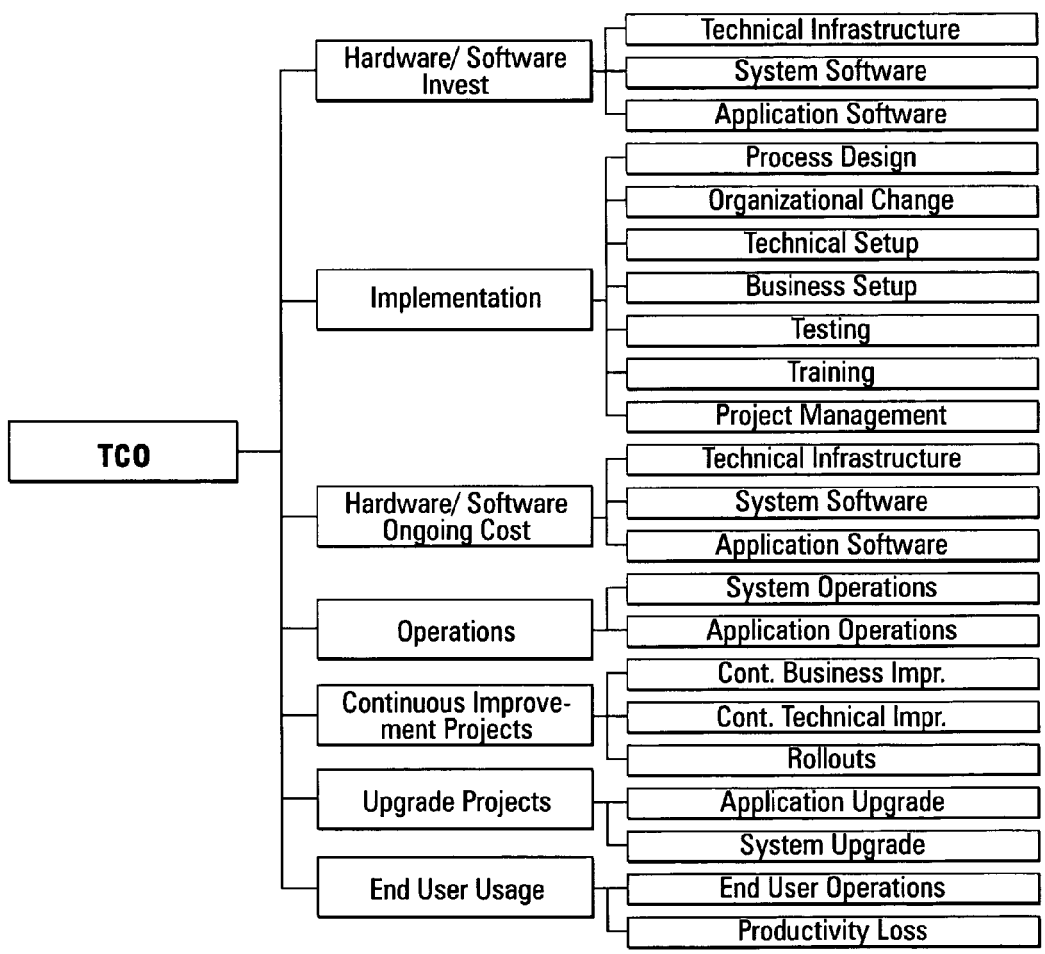
Figure 1B:
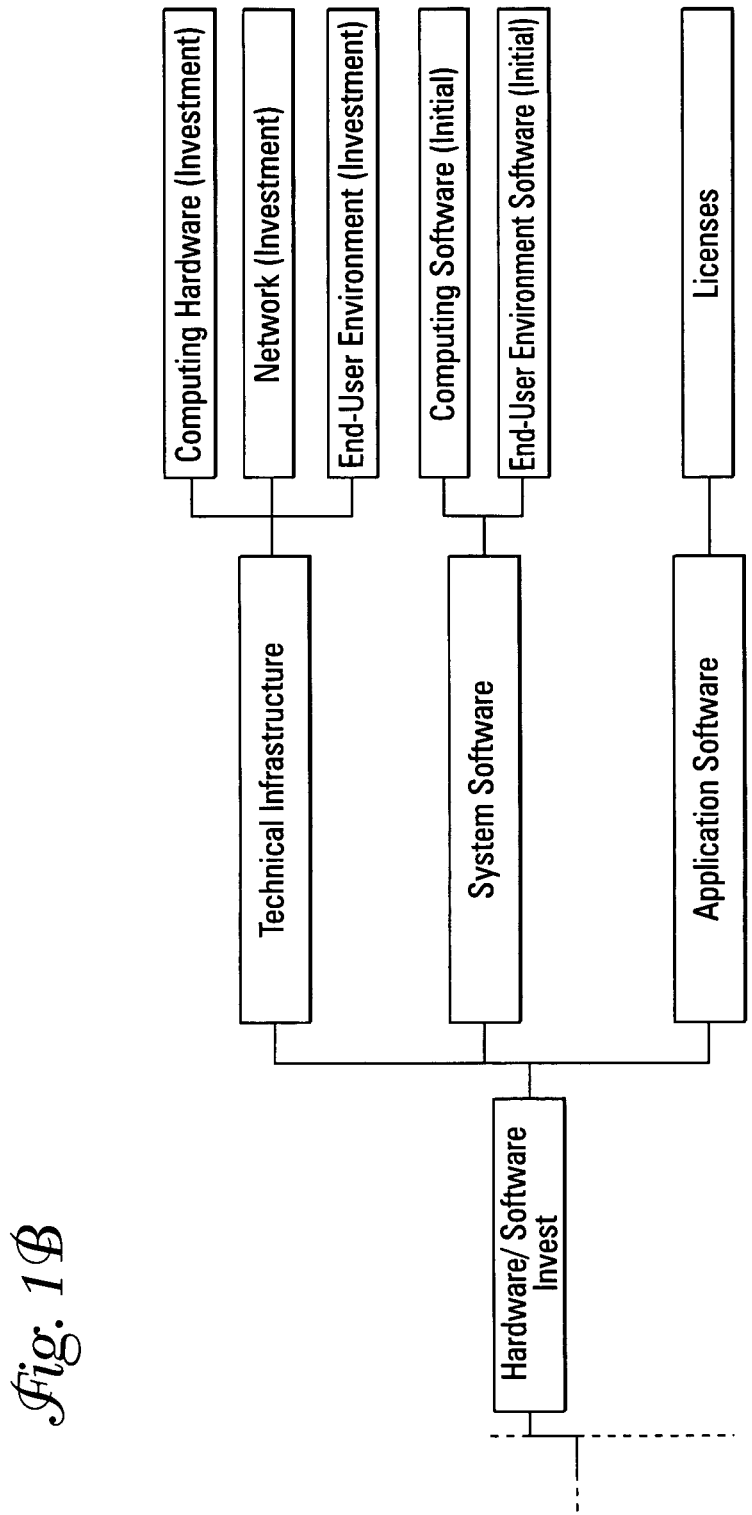
Figure 1C:
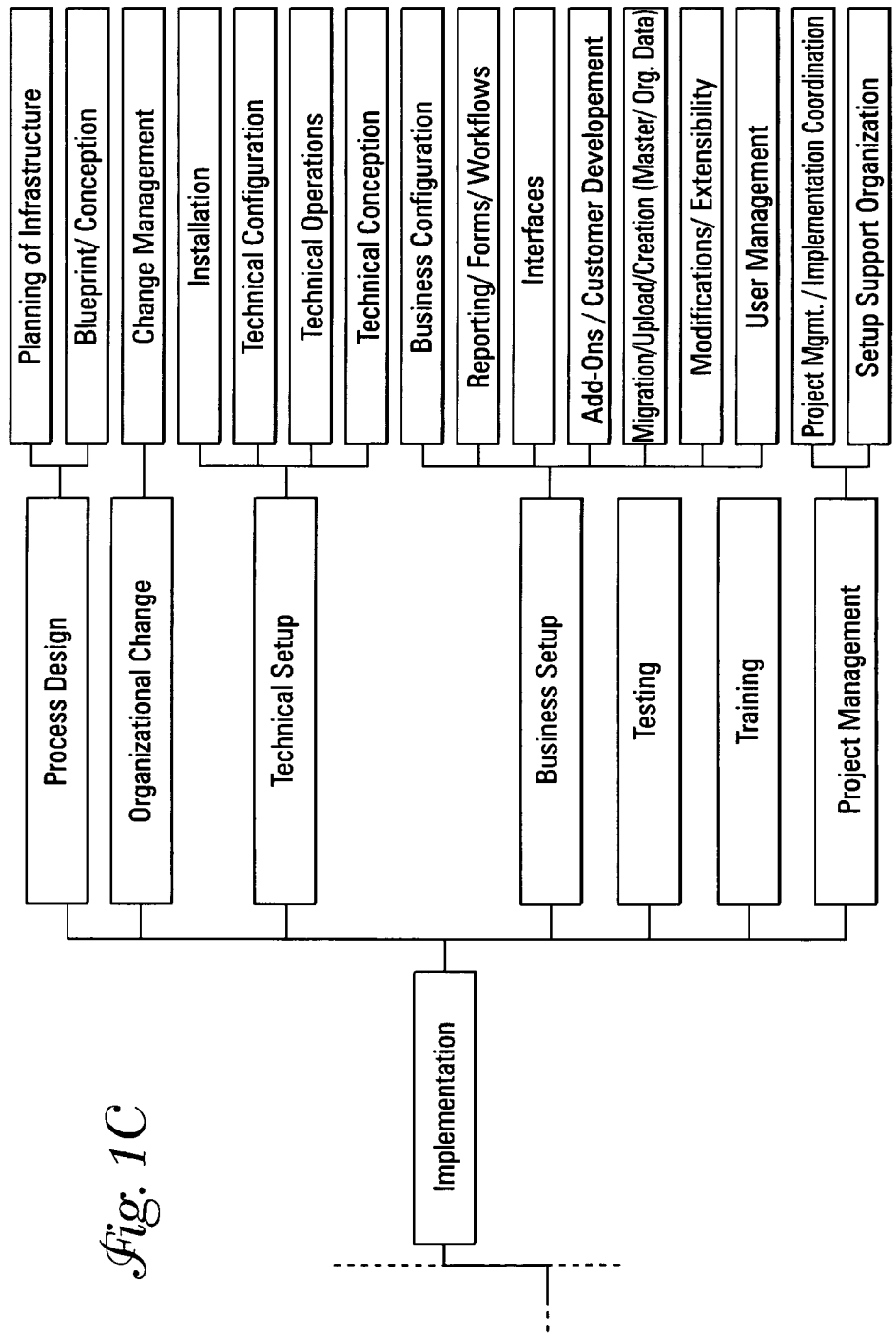
Figure 1D:
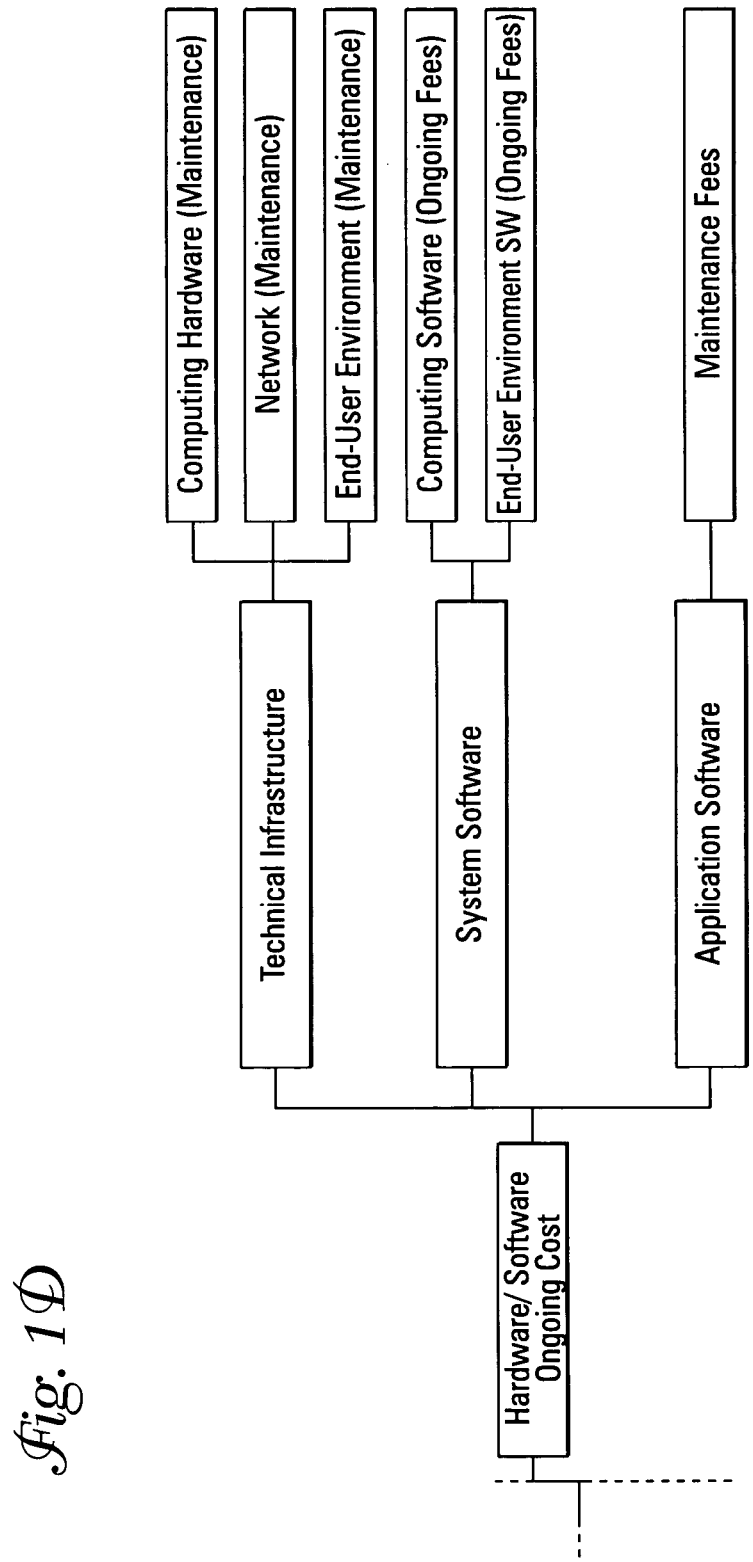
Figure 1F:
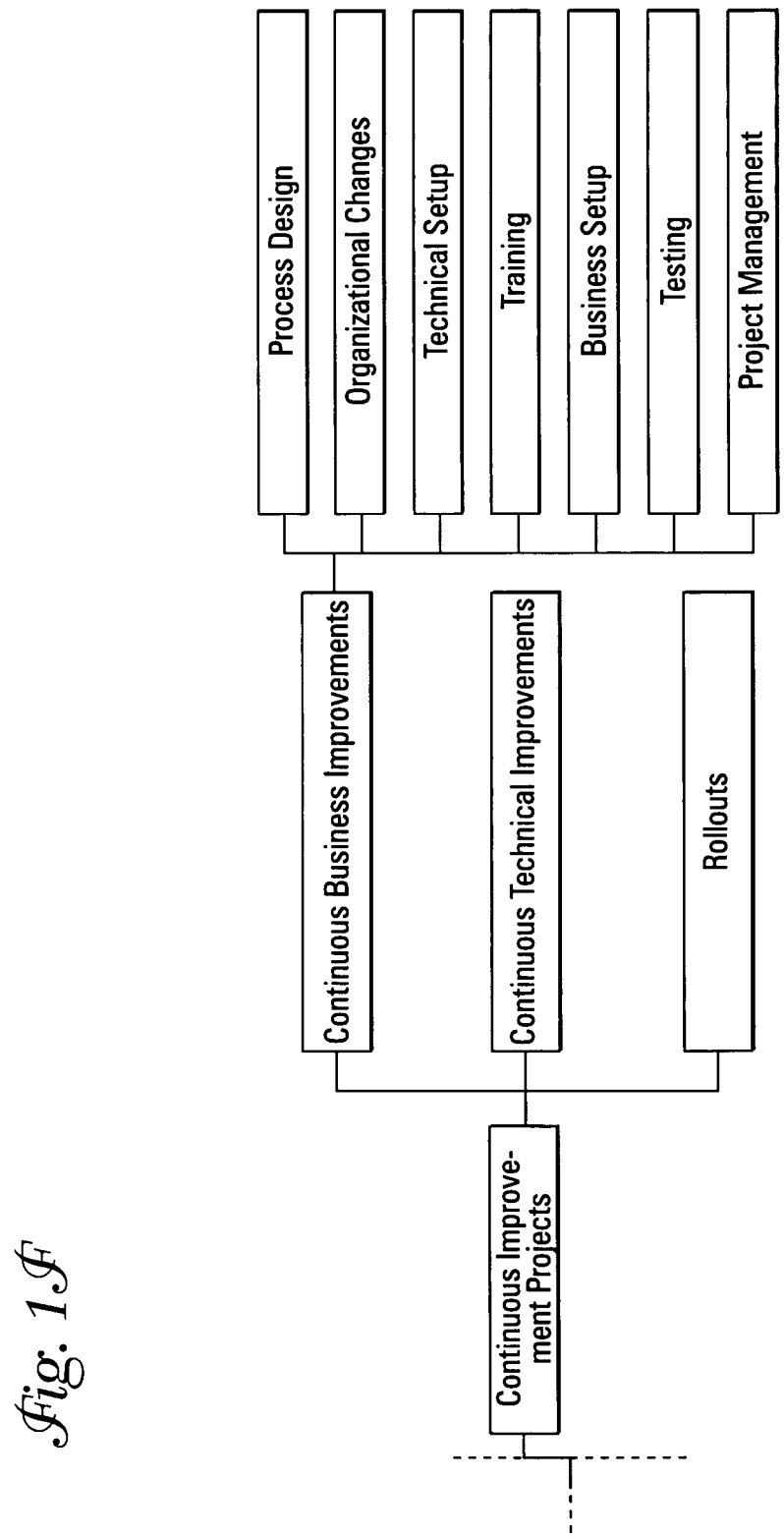
Figure 1G:
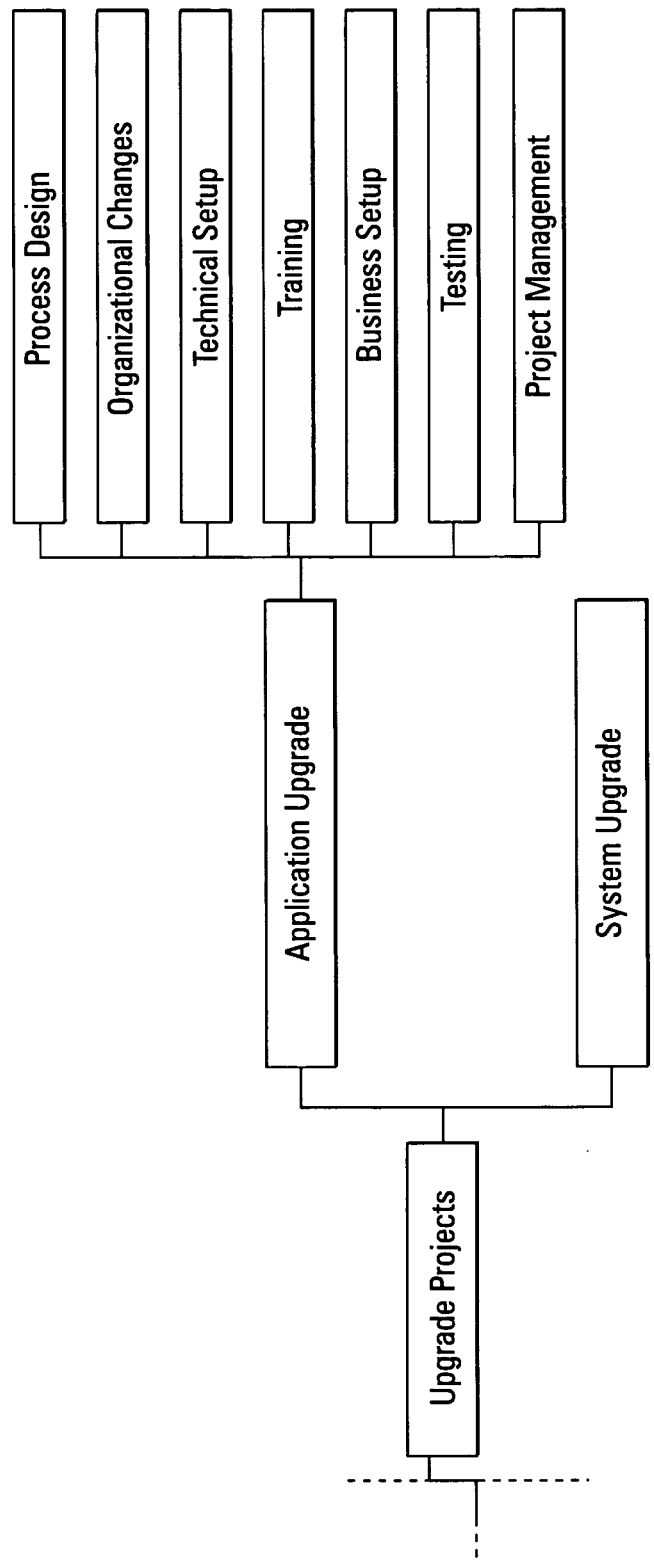
Figure 1H:
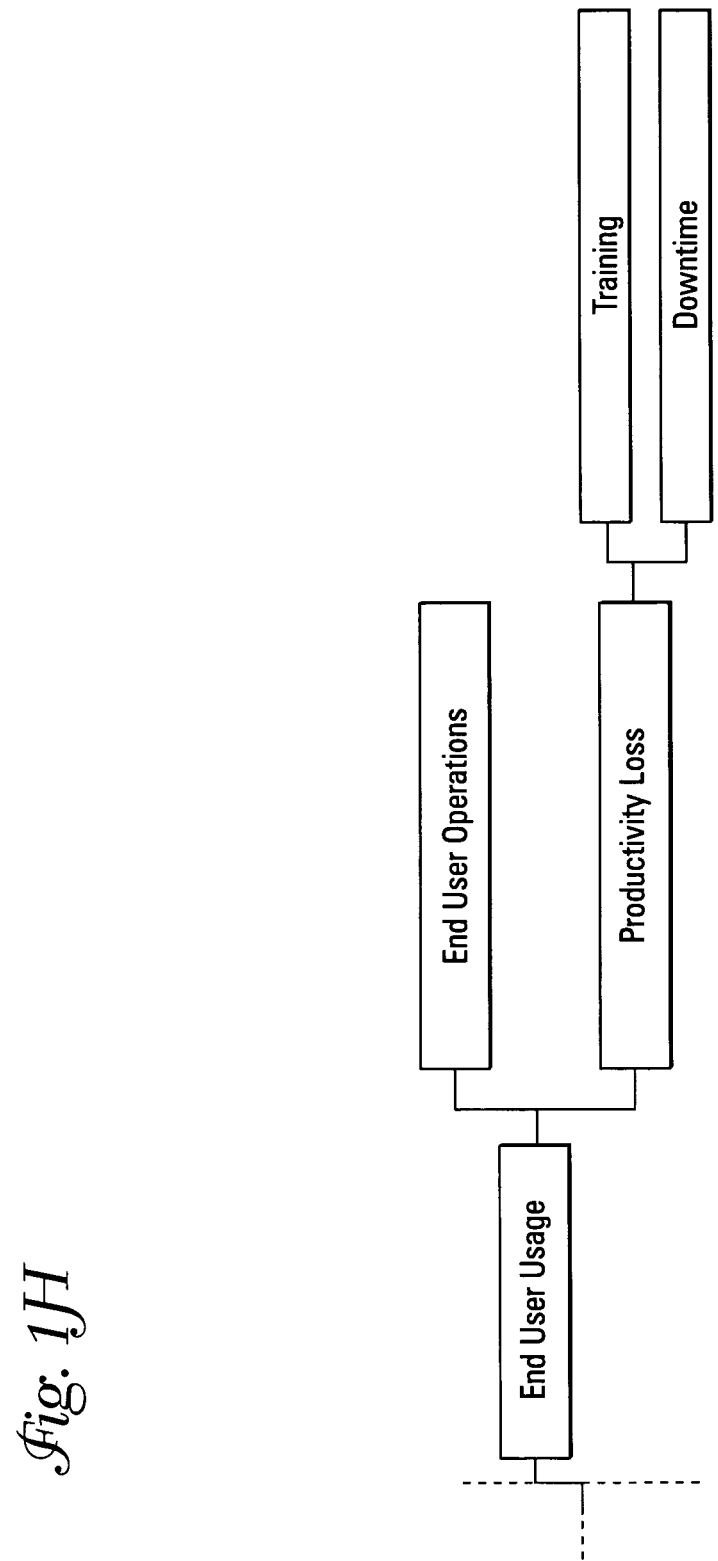
Figure 1I:
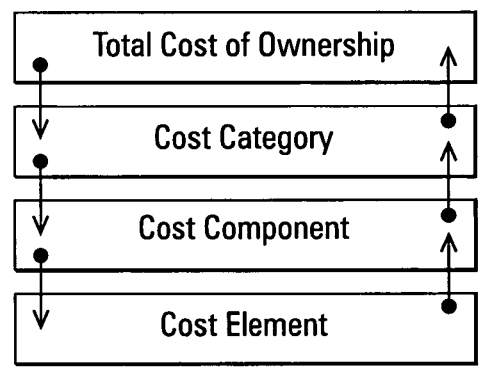

A total cost of ownership (TCO) model for enterprise computing systems, as shown in FIGS. 1A-J and as described in this document, is a holistic view of a cost structure and covers direct costs as well as indirect costs, investment costs as well as ongoing/running costs. The model comprises life cycle and cost component views. Cost elements are assigned to each cost component, which in turn are assigned to cost categories, as shown in FIG. 1I.

Cost Category=for example, hardware/software invest, implementation, etc.

Cost Component=for example, technical setup, business setup, etc.

Cost Element=for example, business configuration, add-ons/customer development

Cost Types=for example, investment/project costs, running costs, etc.

This TCO approach is focused on costs arising for an enterprise computing system (ECS) solution within initial setup, operations, continuous improvement and release management, as well as in the area of end user operations.

An Example TCO Model

As shown in FIG. 1A, an example TCO model is divided into seven major cost categories, in which six are direct budgetary cost categories while the last is an indirect non-budgetary one. In detail, the budgetary costs are hardware/software investment costs, implementation expenses, ongoing hardware/software costs, operations costs, expenses for continuous improvement project costs, and upgrade project costs. Costs in the area of end user usage that are incurred by cut over and running the system cannot be measured as specifically as the direct costs, and thus have an rather indirect character. Nevertheless, they have major impact and thus should typically be taken into account. These previously mentioned cost categories will be described in detail in the following.

A. Hardware/Software Invest

Components of this cost category are firstly the investment costs for the technical infrastructure in terms of the required computing hardware, network and equipment within the end-user environment. Secondly, part of this cost category is system software, including all expenses in the computing as well as in the end user area. Finally, part of this cost category is also the actual investment costs for the solution licenses (excluding maintenance fees). The cost components are defined in more detail below. It is noted that this investment cost category includes not only the initial investment costs, but also includes acquisition costs for hardware that arises due to an upgrade project, e.g., additional servers.

1. Technical Infrastructure

The cost elements of technical infrastructure are shown in FIG. 1B. In general, there is a distinction between the technical infrastructures needed in the central installations, including the computing hardware, the equipment required for the network and the actual hardware for the end users. While the computing hardware combines all the costs for acquiring servers, storage, databases, backup units, the cost element "Network (Investment)" refers to the investment costs of the network environment. In contrast, the end-user environmental hardware consists of all the costs for acquiring the end-user "work stations"—whether static or mobile. These different cost elements are defined individually in the following.

Computing Hardware (Investment): The cost element computing hardware combines all the costs of running a computing center, that is, the required hardware for the application software, additional costs such as the for storage units and any associated costs. These costs are assigned with the acquisition costs. In detail, this includes all application servers, the databases belonging to them, and the middleware and storage servers. Besides also the costs of security and archiving the data, for example backup units and archiving systems, are assigned to this cost component as well. Apart from the actual computing hardware in the broadest sense, the entire initial construction changes essential to running the computing environment—like the room, air conditioning, power supply—are included in case they arise and there is a causal connection.

Network (Investment): The cost element network combines all the costs for the network environment required for running the application software. Those include the setup and adjustment costs for the actual required network. These costs are assigned to the acquisition costs. In detail, these include, in addition to the actual network, the costs of security such as firewall servers and connections such as network switches. Thereby, the actual hardware as well as all construction changes that might occur are taken into account.

End-User Environment (Investment): In contrast to the computing hardware and network costs, this cost element includes all costs of running a decentralized infrastructure based on the computing hardware and its network. These costs are assigned to the acquisition costs. In detail, this means that all of the costs arise at the end-user working places such as the client/server system, and includes the equipment belonging to it (keyboard, mouse, and so on) as well as any mobile equipment, such as mobile devices. Examples are tablet personal computers, handhelds, and cell phones that are required to work with the solution.

2. System Software

The cost component "System Software," also shown in FIG. 1B, refers to all kinds of costs related to software "usage rights." Depending on the pricing model, fixed and variable costs result. An example of fixed costs includes a specific contract volume, while the variable parts might be the fee for special services. Further, variable costs may include the recalculation of changed or incorrectly sized systems or additional charges for the right to use specific software. While the variable part of the fee is assigned to the annual ongoing software costs, the fixed elements are counted as initial costs within the cost component. Similar to the division of the technical infrastructure into the cost elements computing and end-user environmental hardware, the same division exists for "system software"—there are "usage rights" for servers and databases, and licenses for end-user groupware rights. Here, only the separation of the application software licenses into self-contained cost component is taken into account.

Computing Software (Initial): Consequently, the computing software combines all of the rights regarding the deployment and management of the servers, middleware, storage, network, and so on. This is mainly the actual system software in form of the operating system but also other rights-related costs that may be incurred, for example, fixed costs for firewalls, separate middleware software, archiving or monitoring software.

End-user Environmental Software (Initial): Apart from the computing software, the end-user environmental software includes all rights for working at the end-user front end. A classical example is the usage rights for the operating system and groupware licenses.

3. Application Software

Parts of this cost component, shown in FIG. 1B, are all costs related to the license costs of the actual application software. This can be, for instance, the actual core enterprise resource planning (ERP) software. Thus, the license cost might be split up in several parts, or might be part of one contract. The base for pricing may be, among others, the amount and type of users, the engines as technical base underneath the customer solution, or the throughput of defined objects.

B. Implementation

The cost category "Implementation" deals with the initial implementation of a software solution on the customer side. The implementation process starts with the presales phase and ends when the solution is productive. All project costs incurred afterwards are part of the cost category continuous improvement, either in terms of a rollout of the implemented solution or a continuous business improvement. As shown in FIG. 1C, the implementation phase is divided into seven major cost components. In detail, these are the process design as the conceptual phase, followed by a realization phase consisting of the organization changes, the technical and business setup, and the testing. Simultaneously, the training is realized and the project management is in place. In this context, note that the cost components are not divided by chronological sequence, but rather are divided by their functions. Thus, there is kind of interaction between all of these cost components in the implementation phase. The cost categories of the cost components "Implementation" are described in the following.

1. Process Design

The purpose of this cost component is to get a clear big picture of the implementation scope of the specific software solution. As shown in FIG. 1C, this cost component includes the definition of the objectives of the software solution implementation and tries to identify the conditions that need to be fulfilled to achieve the targets of the actual realization phase. It is mainly divided into two major cost elements—the "Planning of Infrastructure" and the "Blueprint/Conception" of the solution. While the "Planning of Infrastructure" includes all costs related to the sizing of the system and the vendor evaluation process, the cost element "Blueprint/Conception" incorporates all of the expenses for the actual process design. Note that IT strategy costs in terms of development of an overall company IT strategy are excluded explicitly, as they can be interpreted as kind of neutralized. They would arise in any case, regardless what kind of standardized business software the company would implement. Costs are only in focus upon starting the actual realization phase (technical and business side).

Planning of Infrastructure: The planning is an analysis of the processes from a technical point of view and is intended to clarify the requirements of the solution by investigating the number of users, the required performance, analysis of the existing technical infrastructure, and other related tasks. Thus, the "Planning of Infrastructure" includes all the tasks that relate to the realization of the identified requirements, for example, the sizing of the hardware so that the business processes can run in the way they are required later on, and the detection of potential dependencies, such as the platform type.

Blueprint/Conception: The main focus of the blueprint phase is to develop a thorough conceptual approach for the procedures and requirements for reproducing the business processes in the system. All expenses related to this area of activity are combined within the cost element "Blueprint/Conception." In detail, this includes the investigation of the company's specific characteristics, choice of functionality, definition of the specific requirements, and, derived from this, the definition of the relevant customizing settings, the definition of the user roles, the authorization requirements, and, if made, the specification of code modifications. In this context, some matters have to be clarified additionally, such as the implementation strategy and the standards for the implementation.

2. Organizational Changes

Organizational changes sums up all expenses related to introducing the software solution into the actual organization, and includes, for example, the operations procedure of the employees. A good example is the change of operations procedure of an employee who used to have business contact in an informal way but now is required to contact via the business solution (for the sake of data consistency, transparency, etc.). In contrast to training, this is not the teaching of the actual application handling, but rather is the change in the mindset of employees. In contrast to Business Process Reengineering, this has nothing to do with the performing of overall checks of all organizational tasks and work cycles within the company in terms of critically examining how reasonable and effective the processes within the company are. While training is part of a separate cost component, general Business Process Reengineering is excluded entirely. The reason for its exclusion is that any organizational change activity that is not directly linked to the solution can be seen as cost neutral. It would arise in any case, regardless how efficiently the processes can be mapped within the system. Thus, the simplicity of adapting an organization to the actual software is kept in focus.

3. Technical Setup

This cost component combines, as shown in FIG. 1C, all costs related to the more technical tasks of getting the system started. It is divided into the installation of all software, the configuration, and the overall technical operations throughout the implementation process, including technical change management. At the same time, the definition and development of the technical conception, mainly used for operations later on, is part of the technical setup cost component.

Installation: Installation is the implementation of all software necessary to run the system and the system landscape from a technical point of view. In detail, this includes the installation of the system software, for example, the operating software. On top of this, the core application software and related software is installed, for example, groupware and tools.

Technical Configuration: The purpose of the configuration task is to design the initialized software in line with the company's specific requirements, including integration of the various applications. In detail, this is the configuration of the application software and the software related to it, for example, groupware and tools from a technical point of view, such as monitoring parameters, performance parameters, definition of alerting, etc.

Technical Operations: Part of this cost element is the operations of the system throughout the whole implementation phase. This corresponds, to some degree, to actual operations after the system goes live, for example, the system monitoring. Here, technical operations begin with the deployment of the first software component. Examples are monitoring the solution components in every respect, administration tasks like load balancing and transport management, and technical tests, for example, backup recovery tests.

Technical Conception: The technical conception deals with the design of rules for normal operations and in case of emergency. Since a key competitive factor is that the system be secure and process data consistently, scenarios may need to be developed to deal with deviations. Examples are the development of general operational guidelines, the creation of archiving and backup routines, the design of backup recovery scenarios, and the definition of security policy.

4. Business Setup

The business setup includes, as shown in FIG. 1C, all activities necessary to form and run the actual software solution in a way it is conceptually defined within the blueprinting of the process design. To achieve this business fit of the solution, various tasks are typically carried out, starting with the business configuration of the application in terms of maintaining the relevant settings. Further on, the business setup includes the customization of all the necessary system diversifications, for instance, extension through add-ons/customer code or modifications. Other key tasks are the fade in of all relevant data and migration of existing data—for example, from legacy systems into the new system, adaptation and creation of reports based on the business needs, and setup/adjustment of the forms and workflows. Creation of the authorization concept and user profiles also are typically carried out. This is illustrated in detail in the following. In this context it is taken into account that in case a customer is not deploying a solution with components from a single vendor, but rather is using a vendor's platform as development environment, the costs arising by the development of individual applications is accordingly included in Business Setup.

Business Configuration: Business Configuration combines all of the efforts related to configuring the application(s) as required for the business fit. As the functionality offered within the software has to be adapted to the requirements of the companies, various settings are maintained to get the software to work in the way the process itself is realized in the company. For instance, within the pricing it needs to be determined what discounts are offered for what kinds of products and in what timeframes. Business Configuration is different from add-ons/customer code or modifications. While Business Configuration only includes the efforts related to tuning the settings in the standard software, add-ons/customer code and modifications are new coding added to the actual coding in the standard version.

Reporting/Forms/Workflows: This cost element covers the setup and design of the reports, forms and workflows for the solution. In detail, within a company there are various reports used for the analytical analysis and/or graphical presentation of data. To have reports that take into account the company-specific requirements for analytics, either reports that have already been shipped need to be altered or new reports need to be set up. There are also various kinds of forms and workflows that have to be adjusted where the standard is not sufficient. Therefore, both the design of the forms and workflows and the actual working procedure behind it need to be maintained. Examples are bill forms that have to be designed in accordance with the actual company bill design, in which case, the system has to be configured so that it prints according to company-specific requirements. All costs related to the setup and design of these reports, forms and workflows are included in this cost element.

Interfaces: To integrate the different software solutions from our vendor as well as with third-party systems, interfaces have to be set up to enable the transfer between the different elements of the software solution. This can be realized for instance by business adapters, special customer developments, and so on. All efforts related to the setup and design of the interfaces for the purpose of integration is included in this cost factor. In the case of an incremental deployments, interfaces in terms of bridging transition systems with the final software solution are built up during implementation.

Add-ons/Customer Development: Add-ons/Customer Development are extensions either to the standard software or to customer individual developed applications, whereby new functionality is inserted using standardized interfaces in the original software. This functionality can be standardized extensions or deployed standard software company-specific coding that communicates using these standardized interfaces. All efforts related to the setup of the add-ons/customer code have to be assigned to this cost factor. The cost elements "Add-Ons/Customer Development" has to be distinguished from the cost element "Modification/Extensibility." While Add-Ons/Customer Development adds functionality in a certified way using standardized interfaces, Modifications reflects the upgrade instability of adding of code.

Migration/Upload/Creation (Master/Organizational Data): If a production system is replaced by a new solution, the data in the legacy system has to be transferred to the new system. Migration is the transfer of the data, for example, organizational data, from the legacy production system to the newly implemented one, which, in the future, will be the production system. This process includes the actual transfer, the preparatory work, and the subsequent maintenance effort. An example is data for various sites of an enterprise about capacity, transportation schedules, and transportation lanes, data about suppliers, and so on. In comparison, transactional data is the order of a specific amount of goods and the planning of its production based on the capacity data. The efforts related to the creation/preparation and/or import of this data in the system is included in this cost element.

Modification/Extensibility: The cost element "Modification/Extensibility" is the adjustment/enhancement of the standard software solution in a non-certified and thus upgrade instable way. While the cost elements "Add-Ons/Customer Development" deals with upgrade stable adding of code, adjustment of User Interface (e.g., field extensions), etc., the cost element "Modification/Extensibility" deals with the upgrade instable enhancement/change of code.

User Management: Within the system, specific users have different permissions for various system objects, such as areas within the business processes or specific transactions. Thus, for every user and user type, specific permissions have to be declared. This is realized by a type of authorization concept in which every user is an object with a specific role, and the necessary permissions are assigned to this object. The permissions depend on the role that the user holds within the company. The costs related in the broadest sense to the setup of the authorization concept (where applicable, aligned with the customer security policy) as well as the realization of it are included in this cost element.

5. Testing

To guarantee the system runs smoothly, it is essential to execute general cross-functional tests, as well as tests that focus on the accuracy of the actual developments. The different types of testing, like module, component, or integration testing, are subdivided into conceptual test preparation for defining the test objective, performance of the test, and the subsequent analysis including potential issue management for any incidents identified by the testing, and are part of this cost elements. Examples for test types are testing of defined processes (business functionality) and scenario-specific requirements (data volume and mass tests), as well as integration requirements (integration testing). On a pure technical level, it refers to availability of a technical component.

6. Training

To introduce the implementation team members, power users and end users to the setup and implemented system, it is necessary to help them get used to the routines and functionality and enable them to handle the solution. Therefore, it is necessary to develop training concepts for the functionality. The training itself can be carried out locally at the company or externally and can be realized in various forms, such as, for instance, by help of tutorial tools or classroom training. Thus, any training costs have to be assigned to this cost component.

7. Project Management

Project Management includes, as shown in FIG. 1C, all costs incurred by organizational tasks for the sake of implementation coordination. Also included is the identification and setup of some kind of support organization.

Project Management/Implementation Coordination: All coordinating and organizational activities related to the implementation project are summarized within the cost element "Project Management/Implementation." Examples are work package coordination, as well as internal and external communication, mainly represented by some kind of project office.

Setup Support Organization: The setup of the support organization—a decisive part of the subsequent operation phase—takes place. While during the implementation, various experts are available locally in the company who can generally solve potential problems quite easily and flexibly, a support structure has to be created for when only some of the experts are still at the company but are still responsible for all problems that arise in the centralized and decentralized solution infrastructure. Expenses related to this area are summarized to the cost element "Setup Support Organization."

C. Hardware/Software Ongoing Costs

The cost category "Hardware/Software Ongoing Costs" is structured in the same manner as the related cost category "Hardware/Software Invest." A distinctive factor is that while the investment costs deal with the initial acquisitions costs, the ongoing costs deal with its (e.g., annual) maintenance expenses. As in the investment section, the cost category "Hardware/Software Ongoing Costs" consists of, as shown in FIGS. 1A and 1D, the cost components "Technical Infrastructure," "System Software" and "Application Software." They are described in detail in the following.

1. Technical Infrastructure

Maintenance refers to all expenses regarding the maintenance of the hardware in its actual status. Thus, the spares and supplies required by all types of software solution hardware, are assigned to this cost components. Expenses therefore are either covered by a kind of "maintenance contract," or might be paid individually. In general, there is a distinction between the technical infrastructures needed in the central installation computing hardware, the equipment required for the network, and the actual hardware for the end users. While the maintenance costs for computing hardware include all the costs for maintaining servers, storage, databases, backup units, the cost element "Network" refers to the maintenance costs of the network environment. In contrast the maintenance expenses for end-user environmental hardware consists of all the costs for maintaining the end-user "work stations"—whether static or mobile. These different cost elements are defined individually in the following.

Computing Hardware (Maintenance): The cost element "Computing Hardware (Maintenance)" combines all the costs of maintaining the initially acquired hardware of a computing center, that is, the required hardware for the application software, additional costs like for storage units and any associated costs. These costs are assigned either with its fixed fee (e.g. monthly maintenance charge) or individual maintenance costs (e.g. expenses for spares and supplies). In detail, this refers to the maintenance of all application servers, the databases belonging to it, and the middleware and storage servers. Besides also maintenance costs related to the security and archiving of data, for example backup units and archiving systems, are assigned to this cost element as well. Apart from the actual computing hardware in the broadest sense, the maintenance fees for the actual data center—like the room, air conditioning, power supply—have to be included in case they arise and there is a causal connection.

Network (Maintenance): The cost element "Network (Maintenance)" combines all maintenance costs for the network environment required for running the application software. These costs are assigned either with its fixed fee (e.g., monthly maintenance charge) or individual maintenance costs (e.g., expenses for spares and supplies). In detail, these include the actual network the maintenance costs of security like firewall servers or connection like network switches. Thus, the actual hardware as well as all constructional changes that might occur are taken into account.

End-User Environment (Maintenance): In contrast to the computing hardware and network costs, the cost element "End-User Environment (Maintenance)" includes all of the maintenance costs of running a decentralized infrastructure based on the computing hardware and its network. These costs are assigned either with its fixed fee (e.g., monthly maintenance charge) or individual maintenance costs (e.g., expenses for spares and supplies). In detail, this means that all maintenance costs arise at the end-user working places, such as for the client/server system, the equipment belonging to it (keyboard, mouse, and so on), as well as any mobile equipment such as mobile devices. Examples are maintenance and repair charges for tablet PCs, handhelds, and cell phones that are required to work with the solution.

2. System Software

The cost component "System Software" refers to all kinds of costs related to software "usage rights." Depending on the pricing model, fixed and variable costs result. While the fixed elements are counted as investment costs within the cost component "System Software (Invest)," the variable part of the fee is assigned to the annual ongoing software costs. Thus, the structure of the cost component "System Software (Invest)" is transferred to this costs component. The only distinction is that within this cost component the ongoing maintenance fees are in focus—instead of the initial investment costs. As in the investment section, also here the separation of the application software licenses into self-contained cost component is taken into account.

Computing Software (Ongoing Fees): Consequently, the computing software combines all fees for the rights regarding the software for management of servers, middleware, storage, network, and so on. This includes mainly the maintenance charge for the actual system software in the form of the operating system, but also other rights-related costs that may be incurred, for example, fees for firewall-software, middleware software, archiving, and monitoring software.

End-user Environmental Software (Ongoing Fees): Apart from the computing software, the end-user environmental software includes all fees related to the rights for working at the end-user front end. A classical example are maintenance charges for the usage rights of the operating system and groupware licenses.

3. Application Software

This cost component includes all maintenance costs related to the usage right of the actual application software. This can be, for instance, the actual core enterprise resource planning (ERP) software. According to the structure of the license cost, the maintenance fee might be split up in several parts among the various components of the enterprise computing system.

D. Operations

The implementation phase is complete by the time the system goes live. All subsequent activities are part of the productive phase. The costs related to the actual operations of the system are part of the cost category "Operations." To get a clear picture of the costs and how they are incurred, the cost category "Operations" is divided into system operations and application operations, as shown in FIGS. 1A and 1E. While the system operations refers to the more technical with respect to system oriented maintenance of the solution, the cost component application operations focuses more on the business related system maintenance activities. A detailed description is outlined in the following.

1. System Operations

System operations refer to all rather technical oriented activities, more focusing on the hardware constitution, system software and application software from a technical point of view. Typically these activities are more related to the maintenance of the data center infrastructure, and therefore, are performed centralized within the data center. They only have indirect linkage to the actual business related activities, and staff providing this work is characterized by a rather "technical" oriented skill set. Looking on the cost component "system operations," it consists of the cost elements "system monitoring," "system administration," "System Problem Management," "Software Change Management," "System Service Desk & Incident Management" and "General/administrative costs for System Operations." They will be defined in the following.

System Monitoring: In general, monitoring means all activities related to control the correct operations of the system. It has a more proactive and ongoing character. Consequently, it plays an important part during the whole operational phase. In general, there can be divided roughly the more business oriented monitoring from the rather technical, hardware and network monitoring. The borderlines especially in the application area are fluent in terms of the activities. Thus, a distinguishing characteristic is less the pure activity than rather the skill set required for it. While the monitoring of networks, database, and hardware is performed by rather technical experienced staff, the correct performing of business activities and the monitoring of business processes requires staff that rather is versed in the value chain of the company. Thus, while the more technical oriented monitoring is performed within the system operations, and expenses are assigned to the cost element "system monitoring" accordingly, the rather business-driven monitoring is more likely realized by experts of the various department and thus part of the application operations. Examples for system monitoring are the check of availability of components, monitoring of network traffic, and load balancing referring to hardware resources and monitoring of capacities.

System Administration: The cost element "system administration" refers to the maintenance activities of the solution in the broadest sense, either in terms of periodical tasks or extraordinary activities. According to the distinction outlined previously, the cost element "system administration" deals with the technical oriented administrative tasks. Examples are system landscape maintenance, starting and stopping activities, capacity management (hardware, configuration, operation modes, etc.), network administration, high availability management, job scheduling in terms of periodical administrative jobs, database management (including backup, restore and test), archiving activities like data archiving or document management, output management, security management, and quality assurance.

System Problem Management: The cost element "system problem management" deals with all activities that serve the resolution of a problem after its identification form a more technical point of view. In general, a problem is defined as an unknown underlying cause of one or more incidents, and a known error is a problem that is successfully diagnosed and for which a work-around has been identified. Thus the goals of problem management are the detection of underlying causes of an incident and their subsequent resolution and prevention. Activities to achieve these goals are the determination of permanent solutions, e.g. by searching for structural improvements in the IT infrastructure to prevent as many future incidents as possible. Thus, the speed with which a resolution is found is only of secondary (albeit still of significant) importance. Examples are logging and tracing, for instance in terms of central logging, single activity tracing or performance tracing. It is taken into account that while the problem management requires a permanent solution and prevention of an incident and classification of the speed with which a resolution of this incident is found, only secondary the incident management aims to restore the service for incident resolution to the customer as quickly as possible. This means that while the focal point of incident management is the restore normal operation as quickly as possible, problem management aims to provide long-term stability in the infrastructure by finding, eliminating, and preventing the causes of incidents.

Software Change Management: The cost element "Software Change Management" all activities related to the continuous change management of the solution from a rather technical point of view. The goal of change management is to ensure standardized methods and procedures for efficient and prompt handling of all changes and the reduction of negative impact caused by change-related incidents (in contrast to release management that deals with change management aspects of a release upgrade). Example changes are characterized by their nature that there should not be delivered any new functionality. In fact, existing functionality should be improved in terms of its quality. Thus, software change management includes all costs related to this software quality improvement process from a technical point of view. In detail, this is the planning process, the actual realization in terms of installation (as part of the system operations) as well as in terms of necessary adjustments and the testing/validation from a technical as well as from a business point of view. Thus, distinctive factor once more is less the actual activity than more the required skill set—technical versus business oriented. While expenses related to the rather business oriented task of the software change management are sum up under the according cost element of the application operations, the more technical oriented tasks of the software change management are assigned to the system operations accordingly. Examples are the patching of components, installation of single corrections, and the transport of customer development and modifications.

System Service Desk & Incident Management: System Service Desk & Incident Management deals with the service desk of system-related issues and the incident management that arises in the area of the rather technical issues. The service desk provides the single point of contact for users to capture, track and resolve service requests and incidents. Thus, service requests (in case there does not exists automation in terms of an "employee self services") are the creation of user accounts or its management. Also, incident management is a part of this cost component. As previously mentioned, the focal point of incident management is to restore normal operations as quickly as possible, in contrast to problem management that aims to provide long-term stability in the infrastructure by finding, eliminating and preventing the causes of incidents. An example is the managing of incidents according to a defined service level (e.g., unavailability or high response time), including the defined escalation procedure. It is noted that support is comparable to a gradual way of incident management, starting at a local level and moving on to a global or development level when the problem cannot be solved. Part of this cost element are all expenses incurred by any business related support activity, regardless of the type of organization it is realized, e.g. first/second/third level support. Thus, system service desk and incident management either aims to restore the service for incident resolution to the customer as quickly as possible or offer services required for general solution maintenance, whereby the resolved incidents and supported services have a rather technical focus. Services desk and incident management also includes activities like service level reporting (figures on professional service quality), etc.

General/Administrative Cost for System Operations: Part of the general/administrative costs for system operations includes expenses that are more of a general nature and serve more than one area directly. Thus, all costs that cannot be assigned unequivocally to any of the previously mentioned cost elements but firstly are related to the operations of the solution and secondly have a more technical focus are assigned to this cost element. An example is training expenses for technical administration staff. The training might have positive effects on the capability regarding problem management as well as the capability of correct administration. As described previously, training thereby includes all costs incurred to enable the staff to gain knowledge regarding system-related tasks and characteristics and to handle technical-related issues efficiently. It follows the same structure. Examples are all expenses related to IT coordination. This includes all costs that arise by managing the IT staff and responsibilities from an organizational point of view. In detail, this includes the management staff and/or administrative staff responsible for the resource allocation, payroll or the communication and alignment with other groups, such as other departments and partners.

2. Application Operations

Application Operations sums up all expenses that are directly related to the actual running of the application and requiring the support/skill set by business experienced employees. In detail, this includes the costs for proactive monitoring and simultaneous administration, problem management, software change management, the service desk and incident management, and general/administrative cost for application operations. In contrast to system operations, application operations are strongly related to the actual business of the company and thus a distinctive factor is the required skill set. While system-related activities can be performed with a rather technical oriented mindset, application operations require the support and skill set by business experienced staff.

Monitoring: As mentioned previously, there are in general two types of proactive and ongoing controlling of correct system status: 1) the more business oriented monitoring, and 2) the rather technical, hardware and network focused monitoring. According to this distinction, parts of the cost element "Monitoring" within the cost component "application operations" are only those monitoring activities that are related to the actual business. Examples for application monitoring are the status check of approval workflows, the status of orders, and the alert management of business process. In contrast, system monitoring deals with the monitoring activities regarding the hardware and the network, as they are not directly linked to the business but rather to the IT infrastructure beneath it. All expenses (e.g. in terms of staff costs) related to these rather business-oriented monitoring activities are assigned to the cost element "monitoring" within application operations.

Application Administration: The cost element "application administration" refers to the maintenance activities of the solution in the broadest sense, either in terms of periodic tasks or extraordinary activities. According to the distinction outlined previously, the cost element "application administration" deals rather with the rather business oriented administrative tasks. Examples are the maintenance of business processes, their starting and stopping, the job planning and creation (including exceptions), the planning of archiving of business related structured and unstructured data or the quality assurance from a business point of view.

Problem Management: The cost element "system problem management" deals with all activities that serve the resolution of a problem after its identification from a more business point of view. In general a problem is defined as an unknown underlying cause of one or more incidents, and a known error is a problem that is successfully diagnosed and for which a work-around has been identified. Thus, the goals of problem management are the detection of underlying causes of an incident and their subsequent resolution and prevention. Activities to achieve these goals are the determination of permanent solutions, e.g., by searching for structural improvements in the IT infrastructure to prevent as many future incidents as possible. Thus, the speed with which a resolution is found is only of secondary (albeit still of significant) importance. It is taken into account that while the problem management requires a permanent solution and prevention of an incident and the classification of the speed with which a resolution of this incident is found is only secondary, the incident management aims to restore the service for incident resolution to the customer as quickly as possible. This means that while the focal point of incident management is restoring of normal operation as quickly as possible, problem management aims to provide long-term stability in the infrastructure by finding, eliminating, and preventing the causes of incidents.

Software Change Management: The cost element "Software Change Management" includes all activities related to the continuous change management of the solution from a rather business point of view. As mentioned previously, a goal of the change management process is to ensure standardized methods and procedures for efficient and prompt handling of all changes and to reduce any negative impact caused by change-related incidents (in contrast to release management that deals with change management aspects of an release upgrade). Thus, software change management includes all costs related to this software quality improvement process. In detail, this is the planning process, the actual realization in terms of installation (as part of the system operations) as well as in terms of necessary adjustments and the testing/validation from a technical as well as from a business point of view. Thus, distinctive factor once more is less the actual activity and more the required skill set—technical versus business oriented. While expenses related to the rather technical-oriented task of the software change management are summed up under the according cost element of the system operation, the more business-oriented tasks of the software change management are assigned to the application operations accordingly.

Service Desk and Incident Management: System service desk and incident management deals with a service desk of application-related issues and the incident management that arises in the area of the business issues. In this context, the service desk provides the single point of contact for users to capture, track and resolve service requests and incidents. Thus, service requests (in case there does not exist automation in terms of a "guided procedure") are the closure of accounts and the problems that arise due to the missing ability of further post-entry. Incident management is also part of this cost component. The focus of incident management is restoring normal operations as quickly as possible, in contrast to problem management that aims to provide long-term stability in the infrastructure by finding, eliminating, and preventing the causes of incidents. Examples are the managing of incidents according to a defined service level (e.g. insufficient response time due to access volume on pricing or pegging functionality), including the defined escalation procedure. It is noted that support is comparable to a gradual way of incident management, starting at a local level and moving on to a global or development level when the problem cannot be solved. Part of this cost element is all expenses incurred by any business related support activity, regardless of the type of organization in which it is realized, e.g. first/second/third level support. Thus, the system service desk and incident management either aims to restore the service for incident resolution to the customer as quickly as possible or offer services required for general solution maintenance, whereby the resolved incidents and supported services have a rather business focus. Part of the services desk and incident management includes also activities like service level reporting (figures on professional service quality).

General/Administrative Cost for Application Operations: Parts of the general/administrative costs for application operations are all those expenses that are more of a general nature as they serve more than one cost element directly. Thus, all costs that cannot be assigned unequivocally to any of the previously mentioned cost elements, but firstly are related to the operations of the solution and secondly have a more business related focus, are assigned to this cost element. An example is training expenses for key users within certain business departments. The training might have positive effects on the capability regarding monitoring, as well as the ability of efficient problem management. As described previously, training thereby includes all costs incurred to enable the staff to gain knowledge of system-related tasks and characteristics and to handle technical related issues efficiently. It follows the same structure. Examples are all expenses related to IT coordination in case they arise. This includes all costs that arise by managing the business related staff. In detail, this is the management staff and/or administrative staff responsible for the resource allocation, payroll or the communication and alignment with other groups, such as other departments and partners.

E. Continuous Improvement Projects

Application requirements in the IT landscape change over time for several reasons. Companies institute business or organizational changes and for this they implement additional functions or they fall back on improvements for the implemented solutions provided by the software vendor with a new release. This can be addressed by a continuous improvement process or by an upgrade. Besides depending from the implementation approach the initial implementation might be continued in terms of stepwise "implementation" of further functionality (incremental deployment vs. big bang approach) or in terms of rollout activities of already implemented functionality. It has to be taken into account that the cost category "continuous improvement projects" is separate from "release management" in terms of "upgrade". Regarding the upgrade cost component, it only includes those costs that arise by realizing a release upgrade, while the continuous improvement cost component includes all costs, incurred by improving the application based on a defined release version. Expenses for "Continuous Improvement Projects," shown in FIG. 1F, are incurred by internal or external projects and exceed certain duration (e.g. two days). The duration upon a task has "project status" has to be defined by its company characteristics, e.g. size of company.

1. Continuous Business Improvement

Part of this cost component are those expenses caused by the continuous improvement of the application from a business perspective—either in terms of continuation of an initial implementation project or by the continued adjustment of the standard business software solution to changing business needs. In detail, this is the renewed configuration of the application and potential use of new functionality (that is already available within the application release), add-ons, and further customer developments to ensure continuous adjustment and improvements to meet market requirements. All of these costs are incurred by internal or external projects and exceed a certain duration (e.g., two days). The duration upon a task is defined by company or cluster the company belong to. The structure of the cost component "Continuous Business Improvements" thereby is copied from the structure of the initial implementation project. This should guarantee the comparability and complete recordability of project data, independent of whether the data refers to the continuation of the initial implementation project or the continuous improvement of the standard business software to new business needs. The cost elements defining the cost component "Continuous Business Improvement" are outlined shortly in the following. In general, their definition outlined within the cost category implementation is still valid in this connection.

Process Design: The purpose of this cost element is to get a clear picture of the project scope of the continuous improvement project. It includes the definition of the objectives of the software solution implementation and tries to identify the conditions that need to be fulfilled to achieve the targets of the actual realization phase. It is mainly divided into the "Planning of Infrastructure" and the "Blueprint/Conception" of the solution.

Organizational Changes: Organizational changes sums up all of the expenses related to introducing the adjusted software solution into the actual organization, such as the operations procedure of the employees.

Technical Setup: This cost element combines all costs related to the more technical tasks that arise throughout the continuous improvement project. This could be the installation of additional software, adjustment of the operating concept, and further technical configuration.

Business Setup: The business setup includes all activities necessary to adjust/enhance the actual software solution in the way it is conceptually defined within the blueprinting of the process design. To achieve this business fit of the solution, various tasks are carried out, starting with the business configuration of the application in terms of maintaining the relevant settings. The business setup also includes the customization of all the necessary system diversifications, for instance extensions through add-ons, customer code, or modifications. Depending on the continuous improvement project, other key tasks are the fade in of data and migration of existing data—for example from legacy systems into the adjusted solution. Also, the adaptation and creation of reports based on the business needs and setup/adjustment of the forms and workflows can be in focus. Creation of the authorization concept and user profiles also might occur.

Testing: To guarantee that the system runs smoothly after finalization of the continuous improvement project, it is essential to execute general cross-functional tests, as well as tests that focus on the accuracy of the actual developments. The different types of testing, like module, component, or integration testing, are subdivided into conceptual test preparation for defining the test objective, performance of the test, and the subsequent analysis including potential issue management for any incidents identified by the testing, and is part of this cost element.

Training: To introduce the implementation team members, power users and end users, to the adjusted/enhanced software solution, it is necessary to help them get used to the routines and functionality and enable them to handle the solution. Therefore, it is necessary to develop training concepts. The training itself can be carried out locally at the company or externally, and can be realized in various forms, like for instance by help of tutorial tools or classroom training. Thus, any training costs attributed to the continuous business improvement project are assigned to this cost element.

Project Management: Project management includes all costs incurred by organizational tasks for sake of implementation coordination and/or the effects (e.g., adjustment requirements) and/or required support activities of the support organization.

2. Continuous Technical Improvement

According to the continuous business improvement, parts of this cost component are those expenses caused by the continuous improvement are not of the application, but are of the technical infrastructure. Examples are the setup of a data-achieving concept within the operations or the consolidation of system landscape/server hardware. Thus, the cost structure of the cost component "Continuous Technical Improvement" follows the same cost structure as any project within the "Continuous Improvement" cost component.

3. Rollouts

As mentioned before, the implementation phase ends when the system goes live. All costs incurred afterwards as project costs are part of the cost category continuous improvement and are assigned accordingly. In case the implementation project is being continued after the solution has gone live in terms of a roll out of the solution to specific company subsidiaries or departments, the costs arise after the actual going life of the system, and these rollout activities are assigned to the cost component "Rollout" accordingly. Thus, the cost structure of the cost component "Rollout" follows the same cost structure as any project within the "Continuous Improvement" cost component.

F. Upgrade Projects

The cost components elements of the "Upgrade Projects" cost category are shown in FIGS. 1A and 1G.

1. Application Upgrade

As already mentioned, another possibility is to adapt applications to changing requirements or to just improve them from a technical point of view by upgrading them. This is also part of the continuous improvement process, but due to its importance and extraordinary character it is analyzed separately. The upgrade is comparable to an implementation project. However, in this connection the degree of adjustment regarding specific cost elements is of interest. Thus, the different areas in which the changes arise are analyzed. This cost component includes the process design, organizational changes, the technical setup, the business setup, the testing and training, and the project management. A distinctive factor is the deployment of a new release version, for instance, in case a customer wants to take advantage of the value potential delivered by this further improved software solution to improve its possibility to react on business needs and forces within its own value chain and/or the one in which the customer is imbedded. The cost elements of the cost component "Upgrade" are described shortly in the following.

Process Design: This cost element includes all efforts related to evaluating and planning the upgrade, the description of the required adjustment, and, if required, the coordination of the project.

Organizational Changes: Organizational changes sums up all expenses related to introducing the new release of the software solution to the actual organization, such as the operations procedure of the employees.

Technical Setup: This covers the adjustment of other software apart from the actual application software that takes place. Examples are the further deployment and thus configuration of tools and coding, in the course of the upgrade or, if required, the adjustment of the operating system.

Business Setup: This includes the efforts for adjusting the software in terms of the upgrade project. In detail, this is the business configuration of the application in terms of maintaining the relevant settings. Further, business setup includes the customization of all the necessary system diversifications, for instance, controlling the validity of add-ons and their maintenance, and all the tasks related to the adaptation and maintenance of the modifications and creation of new ones. Depending on the upgrade project, other key tasks are the fade in of data and the migration of existing data, for example, from legacy systems into the adjusted solution. Also, the adaptation and creation of reports based on the business needs, and setup/adjustment of the forms and workflows can be in focus. Adjustment of the authorization concept and user profiles also might occur. Thus, the reference parameter must distinguish between a pure technical upgrade that only requires "delta customizing" and the deployment of further functionality shipped with the new release.

Testing: All these changes and adjustments have to be tested to ensure smooth operation. In this context, the expenses for the testing are equal to those caused within the implementation phase or continuous improvement project cost component.

Training: Training efforts depend on the degree of changes within the newly released application(s) and new or altered functionality. Thus, the training costs are structured in the same way as the training expenses within the implementation phase or continuous improvement project cost component.

Project Management: Parts of this cost element are all costs that arise by coordinating and support activities required during the upgrade project.

2. System Upgrade

System Upgrade refers to all upgrade activities that are performed on a rather technical level and are related to a change from one release version to another (e.g., sequencing release version). In focus are upgrades, for instance, of the database managing software that the actual application is running on.

G. End User Usage

As shown in FIGS. 1A and 1H, the cost category "End User Usage" consists of the productivity loss and end-user operations cost component. It is taken in into account that while the previous cost categories have a direct, budgetary character, the cost category "End User Usage" has an indirect character. This means that in general the costs are not recorded in kind of accounts (e.g., cost centers as part of the cost center accounting), but rather are assessed indirectly in terms of, for example, an increase in effectiveness due to software solution or productivity loss due to non-availability of the system. Even though, the indirect costs of the cost component "End User Usage" are not inherently part of the company cost accounting, it is of major importance to assess them anyhow. The reason it is important is that these costs arise in the "End User Usage" area due to, for example, low usability on average exceeds the direct costs significantly, and thus are a major part of gaining an accurate picture of the total costs of a solution ownership.

1. End User Operations

The cost component "End User Operations" refers to all activities that do not have a positive impact on the efficiency of the work process supported by the software solution and performed by the certain end user. In this connection, "End User Operations" deals with all costs that arise in the end user area due to inadequate IT support or low usability, user productivity and user satisfaction. Here, in a narrow sense, it could be described with the inadequacy of IT support in any respect, for example, the help desk. Due to this inadequacy, certain IT tasks are performed by end users, either as a conscious decision because information system resources are not relied upon (cultural bias towards self reliance or because service levels do not meet expectations), or because information system resources were not allocated for the support and service functions (leaving end users to provide management and support for themselves). But beyond the costs that arise due to inadequacy of IT support, the cost component "End User Operations" also assesses the degree of user productivity, determined by the solution characteristics (e.g., expected user interaction paradigm, short cycle times of work processes, etc.). A major metric is time, but is weighted with defined cost factors so that comparability to the direct cost categories like "Operation" can be established. An example for assessing user productivity is the comparison of the cycle time for a benchmarked workflow of competitive systems. The meeting of the expected user interaction paradigm and support of high user productivity have a major impact on the work behavior of the employees, and thus the cost effectiveness of the company. In this connection, it is taken into account that while the previously described six direct cost categories (e.g., Implementation) always describe a certain lifecycle phase/situation, the costs arising in the area of the "End User Usage" stretch across all of the lifecycle phases. This means in detail that effects on the, for example, end user productivity has to be observed in the case of normal operations as well as in terms of a product upgrade. To which cost category the assessed data is related is recorded by the reference parameters, discussed later.

2. Productivity Loss

The cost component "Productivity Loss" deals with any outage or failure of the standard business software, either in terms of a system breakdown or bottleneck or in terms of planned unavailability of employees due to training. The two cost elements, shown in FIG. 1H, "Training" and "Downtime" will be described in detail in the following. It is noted that while productivity loss deals with cost elements directly measurable (e.g., system statistics, training accounts), the cost component "End User Operations" in contrast deals with cost elements that are not directly measurable, and thus with are a rather unpredictable quantity.

Training: The cost element "Training" refers not to the actual expenses in terms of training costs (e.g., course charges), but rather to the costs associated with people being prevented from daily work due to training activities. In this context, regardless of how the training activities are performed (e.g., tutorial tools, classroom training, etc.), there is a cost as long as the employees cannot perform the actual work.

Downtimes: The cost element "Downtime" refers to any system breakdown or bottleneck that causes non-availability or low performance of the actual software solution. Referring to the type of downtime, there is a distinction between planned and unplanned. An example of planned downtime is the patching or upgrading of the software. Unplanned downtime would exist in case of an abrupt system failure. Referring to the origin, it can be caused by the underlying hardware (e.g., low performance of the hardware), the network (e.g., inaccessible network) and/or incidents/failures within the software (starting/stopping of application software).

Framework for Providing Context Information

To enable further investigations, the TCO model has to be embedded in a general framework, consisting of the appropriate time for investigating the operations and a detailed description of how the different direct and indirect costs can be incurred (cost types).

A. Definition of the Appropriate Time to Investigate the Operations

There is a suitable time during which the costs of a solution after its implementation are to be investigated. Once a solution has successfully gone live, it is not customary to specify when it will be replaced. As the company has normally invested a considerable amount of money in the new IT solution, it is entitled to run the solution at least until it pays back and, more realistically, significantly longer.

The roll out of a solution within the organization can be a complex and challenging task—potentially as challenging as the actual implementation—depending on the characteristics of the specific company. By achieving a specific level of complexity, it is more the rule than the exception that the duration of a full roll out of a new solution is longer than a year, meaning until it has been rolled out throughout the whole company to every end user. As the running of an IT solution always takes place within an organization made up of people, it takes a certain time before they can handle the system and a further period of time before they are really familiar with the solution. This phenomenon is called the learning curve of the organization, meaning the changes in the knowledge and behavior of the staff over time. To record this curve holistically, an appropriate time for investigation is assessed.

When assessing the total cost of a software solution, upgrades are considered. An upgrade is another challenging task and customers do not want to upgrade their solution immediately after implementing it. An estimate of at least two to three years between the implementation of a solution and its upgrade seems to be reasonable. The post-implementation phase of any release upgrade carried out must also be taken into account.

All of these considerations show that if the timeframe for investigating the costs is too narrow, the total costs of a solution are not reflected and any changes over time are not taken into account. Thus, to record the costs of solution ownership holistically, a timeline of five to seven years of investigation seems to be appropriate.

B. Description of Cost Types that Potentially Arise in a Cost Phase

As discussed previously, the model is divided into different cost types: Hardware/Software Investment Costs, Implementation Expenses, Ongoing Hardware/Software Costs, Operations Costs, Expenses for Continuous Improvement Project, Release Management Costs and costs in the area of End User Usage that are incurred by cut over and running the system and cannot be measured as specifically as the other cost types. In the following there is describes the different types of costs.

1. Hardware/Software Investment Costs

Acquisition costs: These are the acquisition costs arising, for instance, from acquiring the hardware for the application server, storage, end user environment, further network investment, etc. In case a company decides not to acquire this hardware, but rather leases it, these leasing expenses are assigned accordingly.

Licenses: Depending on the pricing model, the total costs for obtaining the right of software usage can roughly be split into a fixed amount and a variable amount. Commonly, the fixed amount includes the contract costs that the customer must pay in order to get the license key and be able to use the software. These contract costs are the base of the initial license cost component. In this context it is also possible to pay a monthly charge in case the customer uses for instance an offer of an application software provider (ASP) or a business process outsourcer. This monthly charge would be part of the license cost component accordingly, as it represents the cost for obtaining the usage right for the software.

2. Implementation

Project costs/staff costs: Implementation projects are normally carried out in the conception and realization phase. Within the realization, the staff can be divided into technical and business experts. In this context, the implementation of the software solution—whether it is the conception or the realization—is carried out by professional external and/or internal staff. While external staff incurs external project costs, the internal staff is either posted to an internal project budget or is assigned to the project, including their wages in relation to the work they perform. Added up, these costs indicate the total project costs. Overall activities, like the setup of the support organization and operation mainly represented by the project office are based on the same calculation as for the assigned internal and external staff.

Special Expenses: All costs, not reflecting the expenses for specific staff, are collected separately and assigned to the appropriate cost component. For instance, referring to training costs, the costs for potential training charges (due requirement of asking for external courses) are assigned accordingly.

3. Hardware/Software Ongoing Costs

Technical Infrastructure: Besides the initial investment for hardware, there are also costs for its maintenance. In this context, maintenance means the ongoing costs needed to keep the software up-to-date. A classical example of those kind of replacement investments are spares and supplies needed in case the originally hardware part somehow breaks. Therefore, in general, various agreements and contracts can exist, for example, service contracts for the hardware or special service agreements. This can be covered, for instance, by a fixed charge (e.g., monthly fix charge of, for instance, x percentage calculated on a base of the actual hardware acquisition price). Costs could also arise in terms of single expenses, for instance in case a new disk drive has to be bought as the original one is broken and the customer does not have a maintenance contract for the hardware.

Licenses: Besides the actual initial investment in the software in order to get the right to use it, there arise costs on an ongoing base. A classical example is the period (e.g., annual) arising application software maintenance charge as a chargeback for the security of the customer in terms of the support the customer requested, and the use of special services and/or right for regular delivery of further "software improvement," for example, in terms of support packages.

4. Operations (System and Application Operations)

Internal Staff Costs: The common way that a system is operated within a company is due to exclusively release staff that charges with a defined skill set and a certain time budget (part time, full time, etc.). This is valid in the system operations area, for instance referring to an IT administrator, but also in the application area. Here, the expert within a department inherits the role of a key user. The wages arising for these assigned resources are assigned to the cost category operations accordingly.

Special Expenses/External Professional Services: In case the system is not maintained exclusively by the customer, but is in part or totally outsourced, the expenses, for instance, in terms of monthly fees, are assigned to the cost components accordingly. In this connection it has to be taken into account that there are multiple ways how external professional services (e.g., partners) can support the operations of the system. Examples are in the system operations, namely, the outsourcing of the system from a technical point of view, and in the use of remote services supported by defined tasks like patching. In terms of the application operations, the outsourcing of business processes is also an example.

5. Continuous Improvement Projects

By their nature, continuous improvement projects are normally similar to an implementation. Both are projects, both are carried out in the conception and realization phase, and for both, internal staff and/or external professional services are needed. Thus, the same as described previously for the cost category implementation is valid for the continuous improvement projects.

6. Upgrade Projects

The situation outlined previously is valid for the cost category upgrade projects too.

7. End User Usage

A base for assessing the costs arising in the end user usage area is most commonly the unit "time." This unit "time" itself is already very expressive (e.g., downtime, cycle time for a certain end user workflow/process). Nevertheless, it also can be assessed with a certain cost factor in order to be comparable with the direct costs—assessed by a monetary unit. As the cost category end user usage is stretched across all lifecycle phases, the effects on the end user usage are measured in any of the arising phases. To which cost category the assessed data is related is recorded by the reference parameters. In sum, it can be put in relation to the sum of the total direct costs.

Reference Parameters—Clustering

So far, the focus has been on pure figures as they arise along the lifecycle of a deployed software solution. This is the first important step in terms of cost assessment. Nevertheless, pure figures are of very restricted information content because only a total sum can be stated and not what that means in terms of, for example, whether or not these costs are high, average or low. Thus, the pure figures have to be set in context in order to make them expressive by help of classification. In general, this can be performed on two levels: 1) in terms of a fundamental classification, and 2) in terms of a rather granular assessment by help of further qualifying information.

A. Complexity Information

The purpose of the complexity information is to perform a rather rough classification by help of rather obvious, and easily recordable data. These data are mandatory for assessment as it allows the assignment of the surveyed costs to a specific cluster according to the complexity profile of the company. Basically there can be mentioned three areas by which the complexity profile of a company may be determined. These are the company profile, the organizational complexity, and the software complexity. These areas are described in the following.

1. Company Profile: The company profile deals with the parameter industry, corporate revenue and size of the company. The industry signifies the area in which the company is running its business, its financial capacity expressed by it corporate revenue and the size of the company in terms of the total amount of employees, suppliers and customers.

2. Organizational Complexity: The organizational complexity deals with the parameters of the company organization and its IT organization. While the company organization gives a hint to the rather general constitution of the organization, the IT organization deals more specifically with the customer's specifics while running IT software. In detail, the complexity of the company organization is defined by the amount of users per user type (occasional vs. power user) and the amount of countries they are active in. In contrast, referring to the IT organization information regarding the degree of centralization, degree of platform and system software diversity and special requirements in terms of high availability and performance may be surveyed.

3. Software Complexity: Finally, also the software complexity may be under investigation—in terms of the micro-economic scope of the solution, the implementation method and the continuous improvement/replacement rate of the solution. As such, the parameter scope refers to the definition of the implemented solution from a micro-economic point of view. The parameter implementation method should give a hint to the degree of configuration and modification and the requirements of change management—thus the use of best practices in the broadest sense. Finally the continuous improvement/replacement rate should express the average, "lifetime" of a solution until it either gets further improved (requirement for agile solution) or replaced. This also is a hint as to the dynamic and business forces within the value chain in which the customer is embedded. It may be taken into account that, in contrast to the qualifying information, the requirement regarding the complexity information that is not the extent of these complexity parameters in terms of multiple, very detailed parameters is important. In fact, the purpose of this complexity information is to serve the goal to deliver a small set of parameters, most commonly rather easily leviable in any customer situation, but expressive enough in order to allow a distinctive differentiation of the pure cost figures to meaningful clusters.

B. Qualify Information

Beside the complexity information there can be surveyed a multitude of additional parameters that gives an even deeper insight into the company constitutions in terms of deploying and operating IT software. This parameter is essential in case route-cause analysis in terms of a e.g. cost drivers on cost element level should be performed. Nevertheless, in most cases there has to be performed a detailed customer assessment in order to get this data. Thus, its collection is obligatory, and it is rather unrealistic to be able to perform detailed customer assessment in any case. Nevertheless, it is important data and as soon as the possibility exists to survey the detailed data, it is more than helpful. This detailed information may be collected along the cost categories on a detailed level. An example is within the cost category implementation, namely, the volumes regarding configured workflows, reports and forms, the amount of data that are part of the initial upload into the system and so on. There may be made available a separate data source (in form, for example, of a spreadsheet file) showing the parameters that are relevant for each cost category.

Using the TCO Model and Framework

Figure 2:
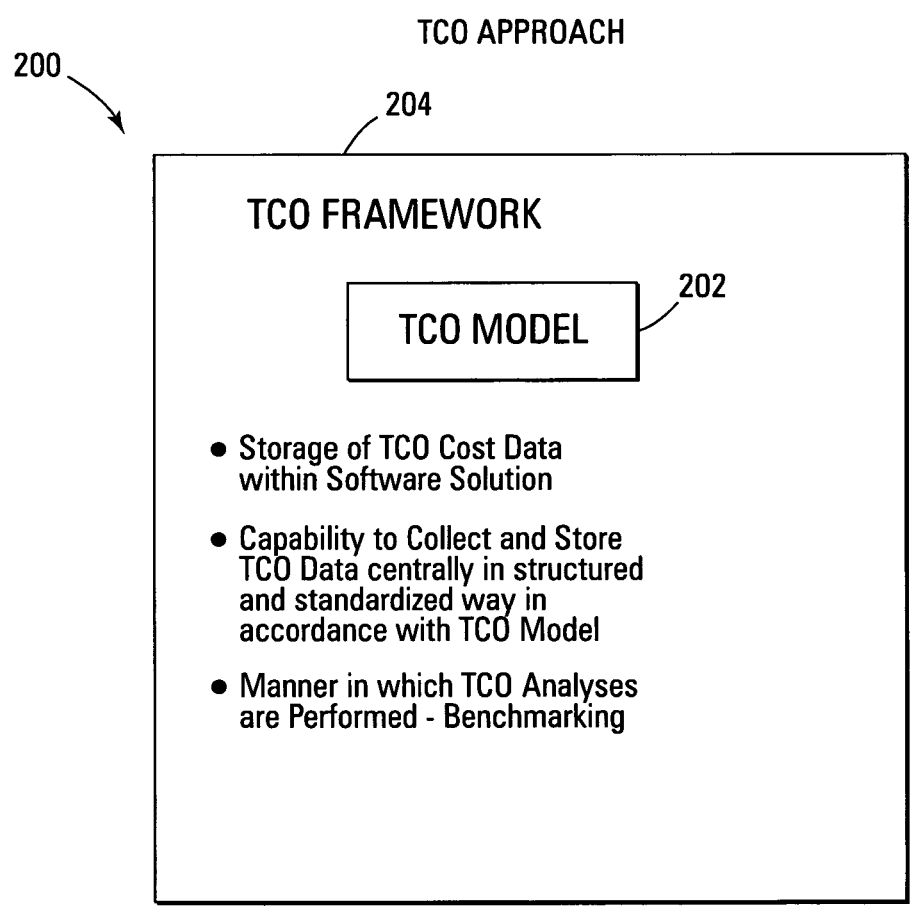
FIG. 2 is a conceptual diagram to an approach for conducting TCO analyses.

Referring now to FIG. 2, there is shown a conceptual depiction of a new approach 200 to TCO analyses of enterprise computing systems. The approach includes a TCO model 202 that is embedded within a TCO framework 204. The TCO model 202 is a standardized cost accounting methodology that identifies all of the costs that are to be included when assessing TCO of an enterprise computing system, such as the example TCO cost accounting methodology described previously.

The TCO framework 204, generally, is what allows TCO analyses to become standardized so that useful comparisons may be made between different enterprise computing systems, and optimizations of systems may be made. The TCO framework 204, in this example, has three aspects to it. The first aspect is the storage of TCO cost data within a software solution, or solutions, that are included in the enterprise computing system for which a TCO assessment is being made. This means that a software solution included in the system is aligned with the TCO model so that the software solution automatically captures the data that are needed to assess the TCO of the system in which the software solution resides. The data may be captured, for example, in data that are periodically stored in various databases, and also in transaction data that are created during the day-to-day usage of the enterprise computing system. In other words, the necessary data are being captured automatically, and are being captured within the enterprise computing system for which TCO will be assessed.

The second aspect of the TCO framework, in this example, is a capability to collect and store all data necessary for a TCO analysis in a structured and standardized way, in accordance with the TCO model that is being used. To illustrate, it will typically be the case that the TCO data that are being automatically stored within the enterprise computing system are being stored in various distributed databases, and along with much other data that are not needed in a TCO analysis. As such, this second aspect of the TCO framework involves, firstly, aggregating all of the TCO data, wherever it may reside, and, secondly, storing the aggregated data in a structured way in accordance with the TCO data model. For example, the data will be stored in association with the particular cost category and component under which the data should be classified, and in association with the particular cost type under which the data should be classified.

The third aspect of the TCO framework is the manner in which TCO analyses are performed. In other words, standardized methods are generated for performing the analysis, so that comparisons may be made to benchmark data for similar enterprise computing systems that have similar characteristics, such as being used for a company of a similar size and in a similar industry.

Figure 3:
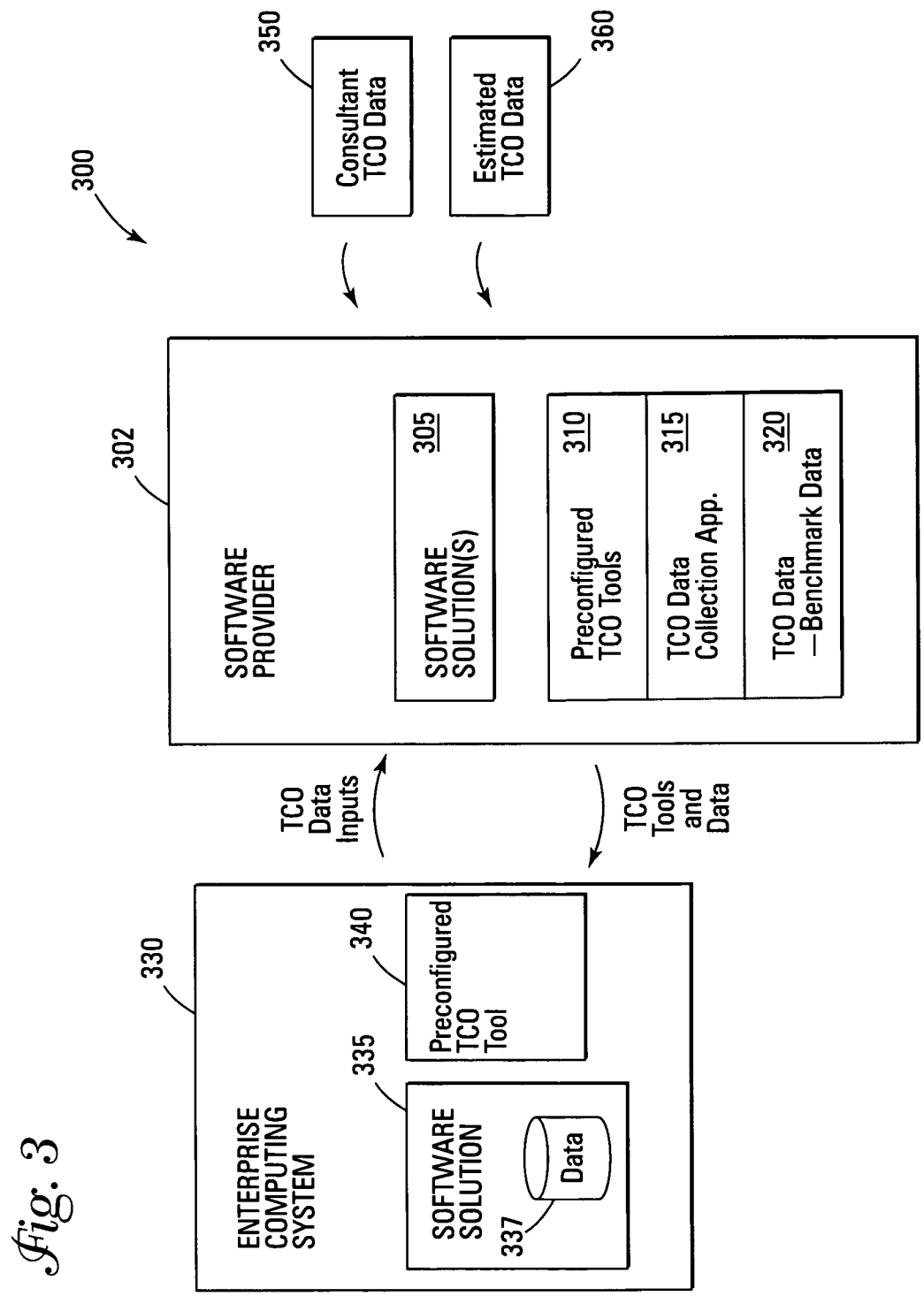
FIG. 3 is a block diagram of example systems involved in the approach for conducting TCO analyses shown conceptually in FIG. 2.

FIG. 3 illustrates one example methodology 300 of how the TCO approach 200 shown in FIG. 2 may be implemented in practice. In this example, a software provider 302 has developed various software solutions 305 that are sold to customers. Also shown in FIG. 2 is an enterprise computing system 330 that has implemented therein software solution 335 that, in one example, was purchased from the software provider 302. In addition, the software solution 335 may include software from other, different software providers, or vendors, as well as the provider 300 shown in FIG. 3. Also shown in FIG. 3, the software solution 335 includes data storage 337 that includes, among other data that is stored on a continual basis in the day-to-day operation of the computing system 330, also TCO data that are aligned with a standardized TCO data model that has been adopted, as discussed previously in connection with FIG. 2. As such, the standardized TCO model creates the base for it.

In the FIG. 3 example, the software provider 302 also has developed pre-configured TCO tools 310 that also may be distributed to customers. For example, the customer's enterprise computing system 330 has implemented the pre-configured TCO tool 310, and is shown in system 330 as tool 340. In addition, the software provider 302, in this example, has a TCO data collection software application 315. This application 315 may be used to collect centrally TCO data 320 conforming to a standardized TCO model from various sources and relating to costs experienced in different enterprise computing systems, including the one enterprise computing system 330 shown in FIG. 3. The TCO data collection application may include automated programs that receive and aggregate automatically TCO data received from the enterprise computing system 330, and also may include database programs, such as Microsoft Access, that may be used to manually enter collected TCO data. As shown in FIG. 3, the collected TCO data 320 may include data 350 from consultants who are familiar with one or perhaps more than one enterprise computing system, and may have the TCO data conforming to the standardized TCO model that has been adopted. In addition, there may be estimated data 360 collected as well. Using all of this collected data 320, benchmark cost data may be determined, and may be determined for different clusters using the reference parameters described previously in the TCO model description above.

Although in FIG. 3 it is shown that the software provider 302 has and distributes the pre-configured TCO tool 310, has and uses the TCO data collection application 315 and owns the TCO data 320 that has been collected, it is not necessary that the software provider 302 perform this role. It may be that a different entity performs these services, such as a consulting entity to name just one example of many.

Figure 4:
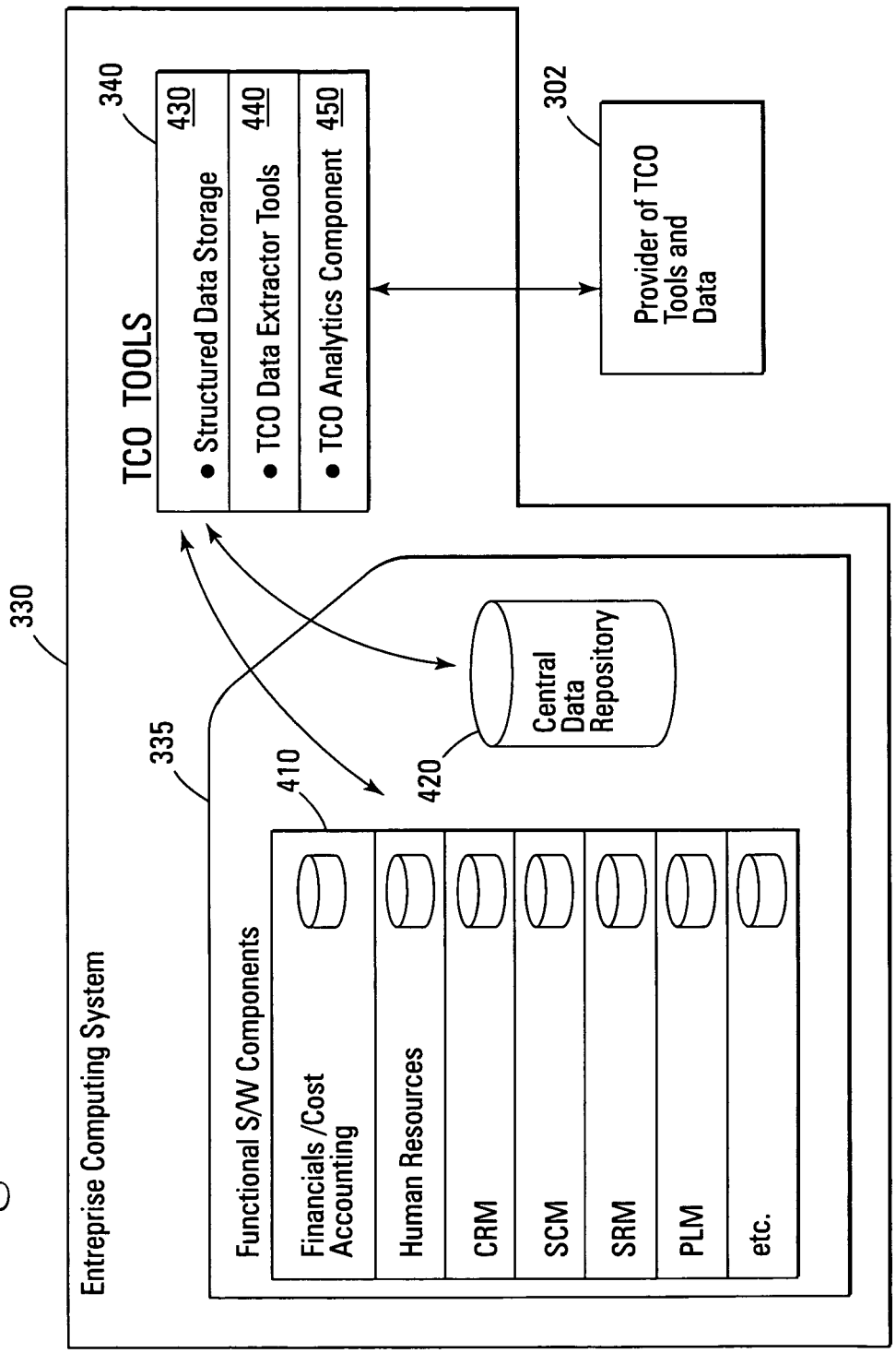
FIG. 4 is a block diagram showing more detail of an enterprise computing system shown in FIG. 3.

FIG. 4 shows in more detail an example of the enterprise computing system 330 shown in FIG. 3. As shown in FIG. 4, the software solution 335 in this example includes several different functional software components 410. The functional software components 410 include, in this example, a financials and cost accounting component, a human resources component, a customer relationship management (CRM) component, a supply chain management (SCM) component, a supplier relationship management (SRM) component, a product life cycle (PLM) component, etc. The functional software components shown in FIG. 3 are examples of functional software components that may be included in an enterprise computing system, and are not meant to be an exhaustive list of components. As shown, each functional software component may have its own dedicated data source, as shown in FIG. 3, and in additional, or alternatively, there may be, as is also shown in FIG. 3, a central data repository 420 for storing data.

As mentioned previously, the software application 335 may be specifically designed to create data that are aligned with the standardized TCO model and framework that has been adopted. For example, the financials and cost accounting component may have stored project costs, for example, expenses involved in certain design or implementation projects included in the adopted standardized TCO model. The human resources component, for example, may have stored data providing time accounting for people that are assigned to perform certain tasks that are considered costs in the adopted TCO model. The CRM, SCM, SRM and PLM components, for example, may be designed to monitor and record downtime, which may be a cost included in an adopted TCO model. Within the financial systems, there could be directly accessed and record the data for any financial investments that is assigned to the TCO model. In case the CRM system creates the help desk for the company, there can be surveyed the service call per components/per site/per employee, etc. Besides the human resources system, there can be surveyed the staff that is working in certain areas like IT department vs. service desk, and the time they are consuming thereby. Potentially, also cycle time for a certain activity as well as user interaction can be measured by software components which may be considered an indirect cost of the enterprise computing system that is included in an adopted TCO model.

As shown in FIG. 4, the TCO tools 340 include a centrally aggregated and structured storage of TCO data. This may be included, for example, in a data warehouse application, such as a Business Information Warehouse (BW) software application provided by SAP A.G of Walldorf, Germany, which application includes data warehousing functionality. Also, the data may be structured using a multidimensional data model, such as InfoCubes which are a multidimensional model that is used in the SAP A.G BW software application. A multidimensional model such as an InfoCube operates to structure data so that the data may be evaluated from different perspectives, as will be described in more detail later. Again, the structured data may be collected from the data sources that reside in the functional software components 335. In addition, there may be additional data that may be added into the structured TCO data storage that is not data that is provided by the functional software components 335. Such data may be, for example, manually entered.

A TCO data extractor tool 440 is a tool that extracts data from the data sources, such as the data sources in the software solution 335 and aggregates the data centrally. The data extractor tool may be pre-configured content that is provided by a software vendor, and must be designed with knowledge of the functional software components from which data are being extracted. Various extraction, transformation, and loading (ETL) applications may be used for this purpose. Such applications extract the data. Such applications also transform the data into a common format and load the data so that the data may be further processed, for example, by being stored in the structured data storage discussed previously.

A TCO analytics component 450 provides the mechanism to view and evaluate the TCO data that has been aggregated and stored in a structured way in accordance with an adopted TCO model. The TCO analytics component 450 may provide the ability to generate reports of the TCO data, and may also provide the ability to compare the TCO data to benchmarks, so that opportunities for optimization of the solution may be evaluated and assessed.

Figure 5:
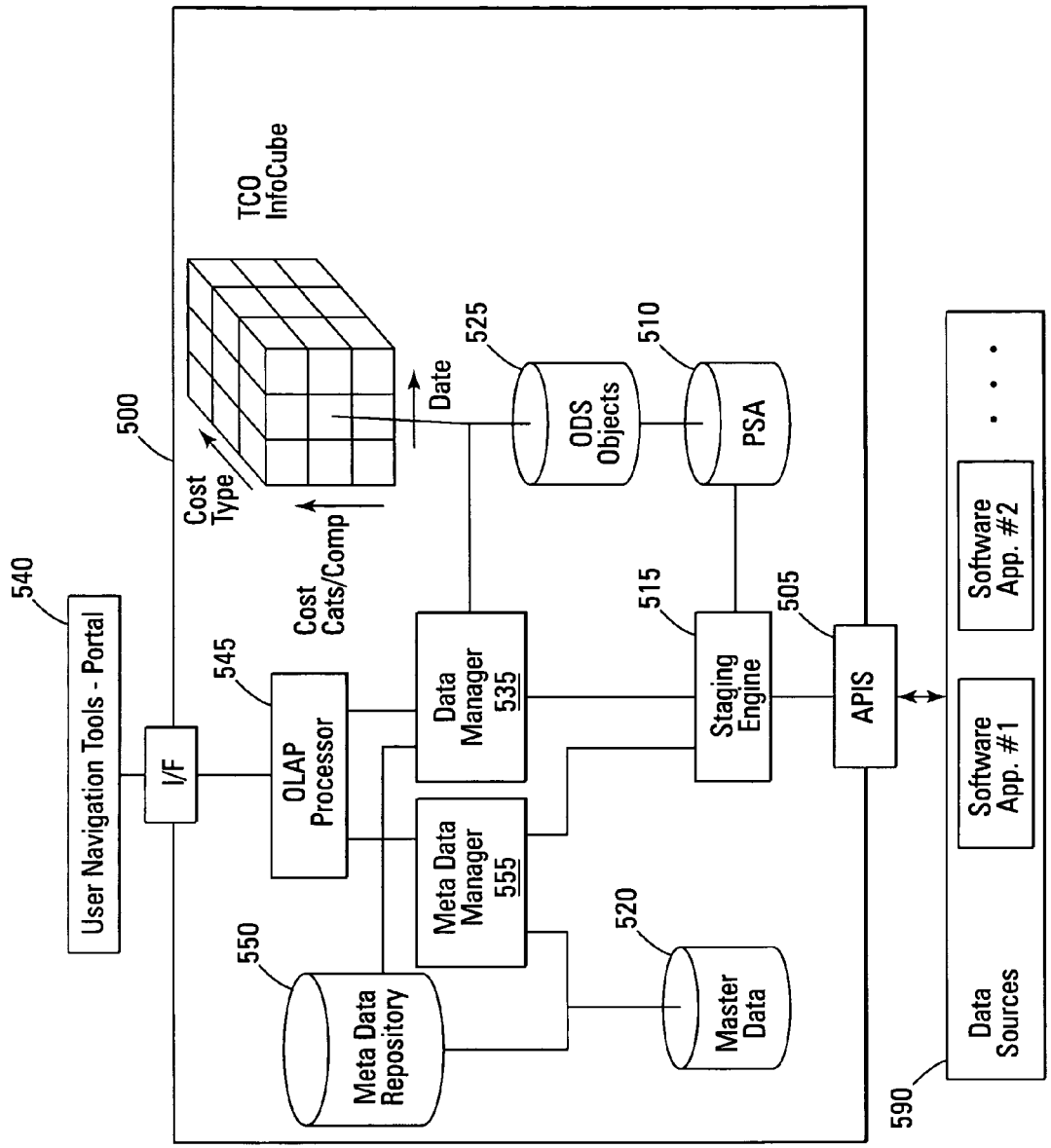
FIG. 5 is a block diagram showing more detail of software tools shown in FIGS. 3 and 4.

FIG. 5 is a block diagram of a system 500 in which the TCO tools 340 shown in FIGS. 3 and 4 may be implemented. In one implementation, the system 500 is a business intelligence solution provided by SAP A.G, which includes the previously discussed BW component. BW provides enterprise-wide data warehousing, a business intelligence platform, and a suite of business intelligence tools. BW uses an information model that is based on fundamental building blocks called InfoObjects. InfoObjects contain data, such as cost data used in a TCO model. InfoObjects also contain metadata, which describes the data contained in an InfoObject, such as its origin, its history, and technical properties. InfoObjects have three classes of metadata: 1) technical metadata that describes technical properties, such as data type and field length; 2) user metadata that contains information about authorizations; and 3) business definitions that form the basis for a common understanding of business terms, such as key performance indicators (KPI's).

Data may be transferred into the system 500 from data sources 590 via application program interfaces 505 in a flat structure—a table—rather than a multidimensional data structure. Data sources 590, for example data sources contained in the software solution 335 shown in FIG. 4. Initially, the received data are stored in a persistent staging area (PSA) 510 under the control of a staging engine 515. The PSA 510 is a set of transparent database tables that act as the initial storage area of data. Requested data unchanged from the source system (e.g., software application #1, #2, etc.) is saved according to the structure defined in the data source 590.

InfoObjects that belong together logically from a business point of view are grouped into InfoSources. The InfoSources can contain both transactional data, which is generated from transaction in an online transaction processing (OLTP) system and master data 520, such as an organizational structure. Master data 520 typically remains unchanged over a long period of time. An on-line data store (ODS) object which is stored in ODS objects repository 525 describes a consolidated data set from one or several InfoSources. In contrast to the multidimensional data models of InfoCubes, data in ODS objects are stored in flat, transparent database tables. ODS object data can be updated into InfoCubes or other ODS objects using a delta update. Data in an ODS object can be analyzed in the same way as data in InfoCubes with, for example, a Business Explorer (BEx), the business intelligence tool of the SAP Business Intelligence solution.

ODS objects 525 are used to populate a TCO InfoCube 530, under the control of a data manager 535. InfoCubes are containers that organize data around its multidimensionality in terms of business dimensions. For example, the example InfoCube 530 in FIG. 5 has dimensions of 1) cost category and components as provided in a standardized TCO model such as the example TCO model described previously, 2) cost type information as provided in the standardized TCO model, and 3) date. InfoCubes may be accessed by an application, such as the SAP Business Explorer application, for reporting and online analytical processing (OLAP) analysis using OLAP processor 545.

The flow of data may occur as follows. Data source data stored in PSA 510 may be transformed into InfoSource data by applying mapping and transfer rules. Next, update rules handle the subsequent flow of data from InfoSources to ODS objects and InfoCubes. Other data flows are possible also. For example, data may be directly loaded into an InfoCube, or several data sources can be assigned to a single InfoSource. In many cases, the data that are stored in the PSA 510 has an incomplete set of metadata. As such, metadata from repository 550, under the control of metadata manager 555, are added when InfoObjects are created and in InfoObjects are bundled to create an InfoSource.

Figure 6:
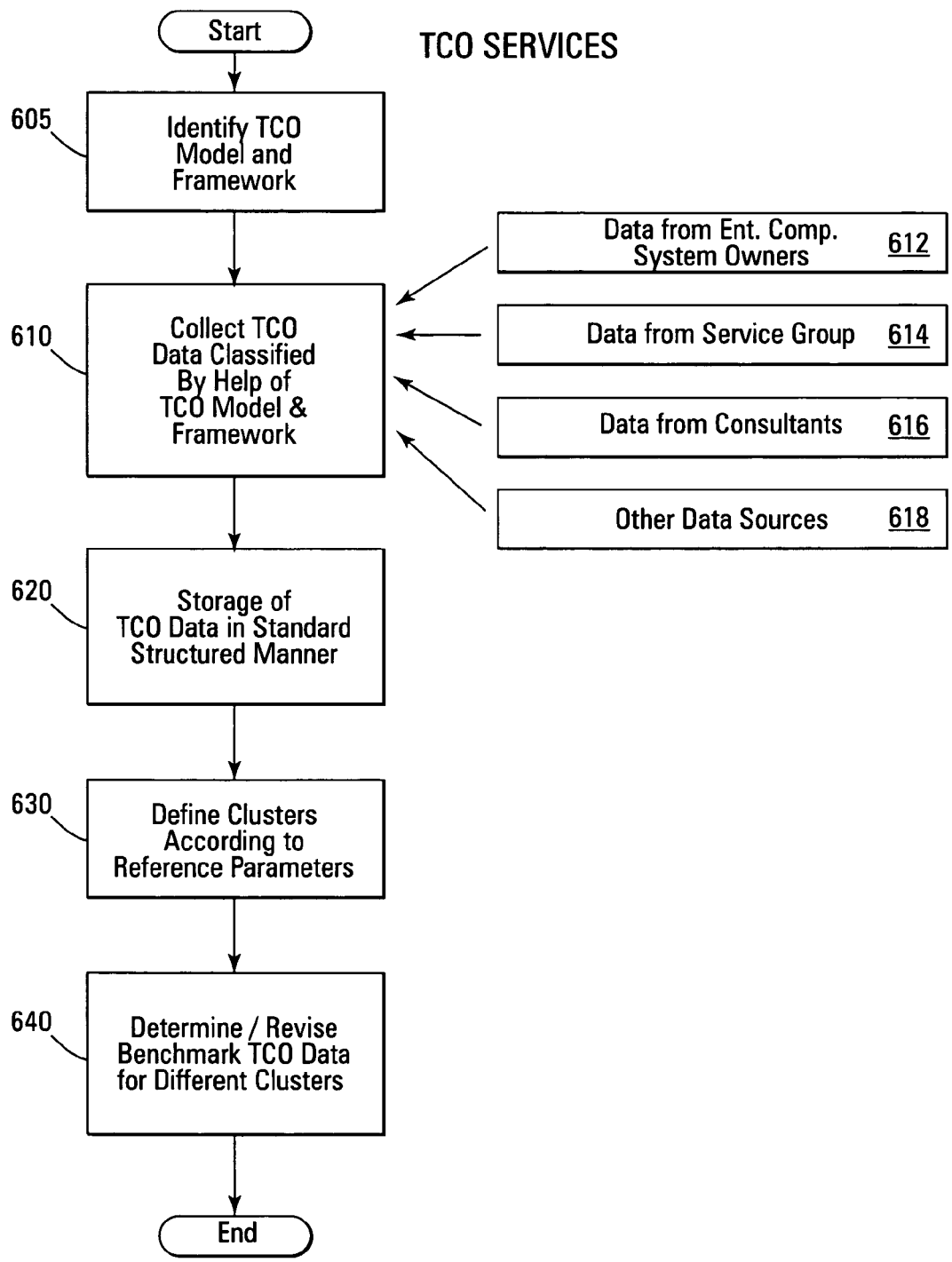
FIG. 6 is a flow chart of a method of conducting TCO analyses of enterprise computing system based on the TCO model as a standardized, structured approach.

Referring to FIG. 6, a process is shown for performing a standardized TCO service for enterprise computing systems. First, at step 605, a standardized TCO model and framework is identified and adopted for use. This is the standardized TCO model described previously. Next, at step 610, TCO data are collected from various data sources. As shown, the collected data may be: 1) data 612 obtained from enterprise computing system owners, a part or all of which data may have been collected automatically using the techniques previously described; 2) data 614 from a services group, for example, a services group for a software vendor that may have access to customer TCO data; 3) data 616 from IT consultants; and 4) other data sources 618.

Next, at step 620, the collected data are stored in a standard, structured manner, in accordance with the adopted standardized TCO model and framework. This step may occur by various automated and manual methods, as described previously. At step 630, clusters of enterprise computing systems having similar characteristics (for example, a medium sized company in the pharmaceuticals industry) are defined, for example, according to the previously described reference parameters. At step 640, benchmark data are determined, and also thereafter revised, for the different defined clusters, so that the benchmark data may be analyzed locally, and so that the benchmark data may be distributed to an enterprise computing system so that local analyses may be conducted.

Figure 7:
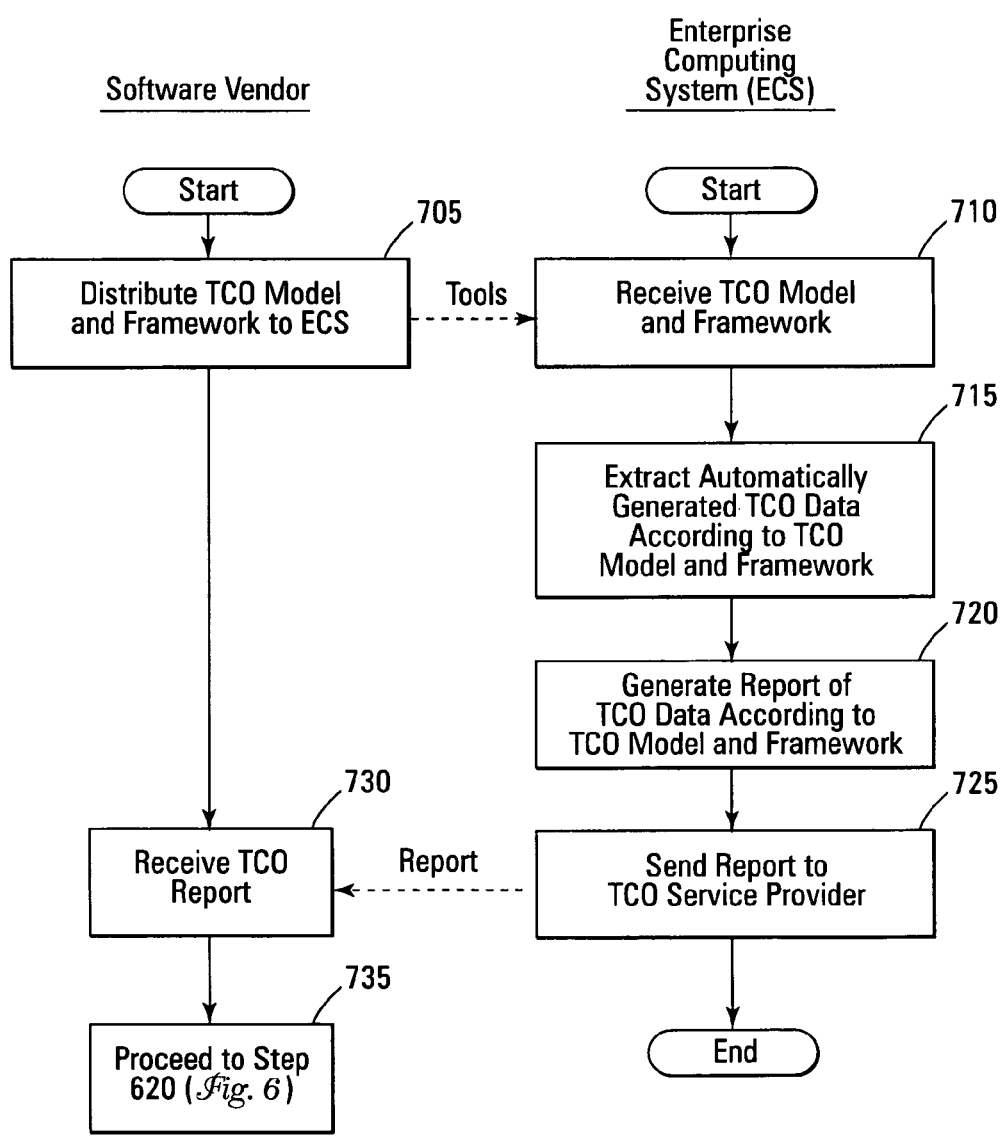
FIG. 7 is a flow chart of a method of collecting TCO data.

Referring to FIG. 7, a method is shown for automatic TCO data collection and TCO report generation. In this example, the method begins, at step 705, with a software vendor distributing a TCO model and framework with various TCO tools to an enterprise computing system. The enterprise computing system may already have implemented software wherein data aligned to a standardized TCO model and framework are being automatically collected. At step 710, the TCO tools are received by the enterprise computing system. At step 715, the automatically generated TCO data that have been continually stored within the software solution components are extracted and centrally aggregated and stored in a standardized and structured way in accordance with the TCO data model, as described previously using tools such as the SAP BW application. As such, the TCO are now available for analysis and, for example, comparison to benchmark data for the cluster to which the enterprise computing system belongs. At step 720, a report of the TCO data may be generated using any of a number of report generation tools, such as the Business Explorer application that is a part of the SAP BW application. Next, at step 725, the enterprise computing system sends the report back to the software vendor, and at step 730, the software vendor receives the TCO data report, and the method proceeds to step 620 of the FIG. 6 flowchart.

Thus it can be seen that there is a possibility to continuously collect TCO data that all conform to an adopted standardized TCO model, and use that data to constantly refine and update benchmark data.

Figure 8:
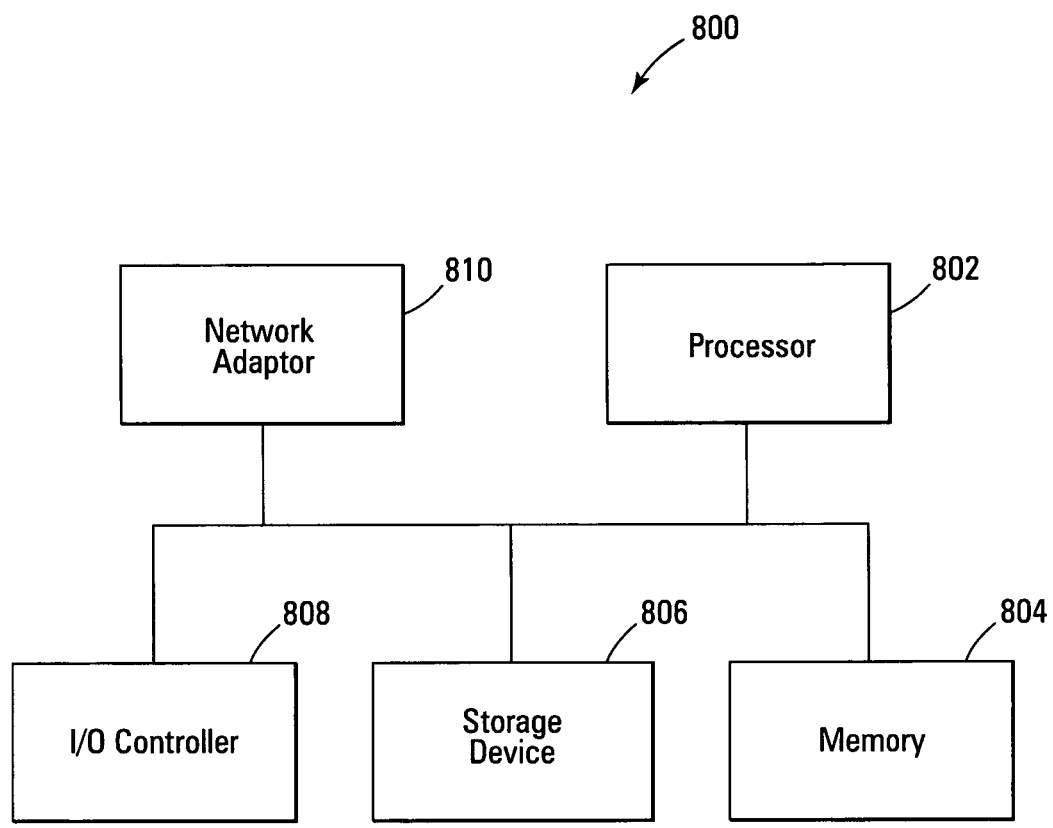
FIG. 8 is a block diagram of computing system components involved in the execution of program instructions.

FIG. 8 is a block diagram of a computing device 800 that may be included within the enterprise computing system 330 or within a system owned by the software provider 302 (see FIG. 3), according to one implementation. The computing device 800 includes a processor 802, a memory 804, a storage device 806, an input/output controller 808, and a network adaptor 810. Each of the components 802, 804, 806, 808, and 810 are interconnected using a system bus. The processor 802 is capable of processing instructions for execution within the computing device 800. In one implementation, the processor 802 is a single-threaded processor. In another implementation, the processor 802 is a multi-threaded processor. The processor 802 is capable of processing instructions stored in the memory 804 or on the storage device 806 to display graphical information for a graphical user interface (GUI) on an external input/output device that is coupled to the input/output controller 808.

The memory 804 stores information within the computing device 800. In one implementation, the memory 804 is a computer-readable medium. In one implementation, the memory 804 is a volatile memory unit. In another implementation, the memory 804 is a non-volatile memory unit.

The storage device 806 is capable of providing mass storage for the computing device 800. In one implementation, the storage device 806 is a computer-readable medium. In various different implementations, the storage device 806 may be a floppy disk device, a hard disk device, an optical disk device, or a tape device.

In one implementation, a computer program product is tangibly embodied in an information carrier. The computer program product contains instructions that, when executed, perform one or more methods, such as those described above. The information carrier is a computer- or machine-readable medium, such as the memory 804, the storage device 806, or a propagated signal.

The input/output controller 808 manages input/output operations for the computing device 300. In one implementation, the input/output controller 808 is coupled to an external input/output device, such as a keyboard, a pointing device, or a display unit that is capable of displaying various GUI's, such as the GUI's shown in the previous figures, to a user.

The computing device 800 further includes the network adaptor 810. The computing device 800 uses the network adaptor 810 to communicate with other network devices. If, for example, the computing system 330 or 302 includes a mobile device that includes the computing device 800, the computing device 800 uses its network adaptor 810 to communicate with a host server over a wireless connection.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method of collecting data used in assessing total cost of owning enterprise computing systems, the method comprising:
    distributing via a network adapter, to a first enterprise computing system, a first electronic data file that identifies, for use by a data extraction tool comprising pre-configured software content, predefined data source fields within the first enterprising computing system that specify predefined costs included in a predefined cost model, the predefined costs to be included in an analysis of a total cost of owning the first enterprise computing system;
    receiving via the network adapter, from the first enterprise computing system, first cost information based on data automatically extracted from the predefined data source fields of the first enterprise computing system by the data extraction tool using the distributed first electronic data file, wherein the first cost information is structured based on the predefined cost model;
    distributing via the network adapter, to a second enterprise computing system, a second electronic data file that identifies, for use by the data extraction tool, second predefined data source fields within the second enterprising computing system that specify the predefined costs included in the predefined cost model, at least one of the second predefined data source fields specifying a particular predefined cost being different from a predefined data source field of the first enterprise computing system specifying the particular predefined cost, and the predefined costs to be included in an analysis of a total cost of owning the second enterprise computing system;
    receiving via the network adapter, from the second enterprise computing system, second cost information based on data automatically extracted from the second predefined data source fields of the second enterprise computing system by the data extraction tool using the distributed second electronic data file, wherein the second cost information is structured based on the predefined cost model;

using the received first and second cost information to determine, by a processor, benchmark total cost of ownership cost information that is structured based on the predefined cost model; and storing the determined benchmark total cost of ownership cost information in a storage device.

2. The method of claim 1, further comprising receiving third cost information compiled by a information technology consultant and including costs associated with an enterprise computing system, and which consultant-provided cost information is structured in conformity with the predefined cost model.

3. The method of claim 1, wherein multiple different benchmark cost information are formulated for enterprising computing systems having a different predefined value for a predefined characteristic of enterprise computing system.

4. The method of claim 3, wherein the predefined characteristic is a size category of an enterprise in which the enterprise computing system is implemented.

5. The method of claim 3, wherein the predefined characteristic is an industry type category for an enterprise in which the enterprise computing system is implemented.

6. The method of claim 1, further comprising electronically distributing the determined benchmark cost information to an enterprise computing system.

7. The method of claim 6, wherein the enterprise computing system to which the benchmark cost information is distributed is configured to aggregate cost information related to its total costs of ownership in conformity with the predefined cost model.

8. The method of claim 7, wherein the enterprise computing system to which the benchmark cost information is distributed is further configured to provide a comparison of its aggregated total cost of ownership cost information with distributed benchmark cost information received by the enterprise computing system.

9. A computer-implemented method of supporting an assessment of a total cost of owning an enterprise computing system, the method comprising:

receiving, via a network adapter, total cost of ownership cost information relating to enterprise computing systems, wherein the cost information for each such enterprise computing system is structured in conformity with a predefined cost model that defines costs to be included in an analysis of a total cost of owning an enterprise computing system, and wherein the receiving of the cost information comprises:
distributing via the network adapter, to a first enterprise computing system, a first electronic data file that identifies, for use by a data extraction tool comprising pre-configured software content, predefined data source fields within the first enterprising computing system and that specify predefined costs included in the predefined cost model;

receiving via the network adapter, from the first enterprise computing system, first cost information aggregated using data automatically extracted from the predefined data source fields within the first enterprising computing system using the distributed first data file, wherein the first cost information is structured in conformity with the predefined cost model;

distributing via the network adapter, to a second enterprise computing system, a second electronic data file that identifies, for use by the data extraction tool, second predefined data source fields within the second enterprising computing system and that specify the predefined costs included in the predefined cost model, at least one of the second predefined data source fields specifying a particular predefined cost being different from a predefined data source field of the first enterprise computing system specifying the particular predefined cost; and receiving via the network adapter, from the second enterprise computing system, second cost information aggregated using data automatically extracted from the second predefined data source fields using the distributed second data file, wherein the second cost information is structured in conformity with the predefined cost model;

using the received cost information to formulate, by a processor, benchmark total cost of ownership cost information that is structured in conformity with the predefined cost model;

storing the benchmark total cost of ownership cost information in a storage device; and distributing to an enterprise computing system 1) a total cost of ownership cost analysis tool that is designed in conformity with the predefined cost model and that is used to perform a local analysis of the total cost of ownership for the enterprise computing system to which the cost analysis tool is distributed, and 2) the formulated benchmark total cost of ownership cost information for use in the local total cost of ownership analysis.

10. The method of claim 9, wherein multiple different benchmark cost information are formulated for enterprising computing systems having a different predefined value for a predefined characteristic of enterprise computing system.

11. The method of claim 10, wherein the predefined characteristic is a size category of an enterprise in which the enterprise computing system is implemented.

12. The method of claim 10, wherein the predefined characteristic is an industry type category for an enterprise in which the enterprise computing system is implemented.

13. The method of claim 9, wherein the distribution of the determined benchmark cost information is accomplished by electronically distributing the determined benchmark cost information to an enterprise computing system.

14. The method of claim 9, wherein the enterprise computing system to which the benchmark cost information is distributed is configured to aggregate cost information related to its total costs of ownership in conformity with the predefined cost model.

15. The method of claim 9, wherein the enterprise computing system to which the benchmark cost information is distributed is further configured to provide a comparison of its aggregated total cost of ownership cost information with distributed benchmark cost information received by the enterprise computing system.

16. The method of claim 9, wherein the receiving of the cost information is accomplished at least in part by receiving cost information compiled by a information technology consultant and including costs associated with an enterprise computing system, and which consultant-provided cost information is structured in conformity with the predefined cost model.

17. A computer program product tangibly embodied in a non-transitory machine-readable storage device, the computer program product including instructions that, when executed, cause a processor to perform operations comprising:

distributing, to a first enterprise computing system, a first electronic data file that identifies, for use by a data extraction tool comprising pre-configured software content, predefined data source fields within the first enterprising computing system that specify predefined costs included in a predefined cost model, the predefined costs to be included in an analysis of a total cost of owning the first enterprise computing system;

receiving, from the first enterprise computing system, first cost information based on data automatically extracted from the predefined data source fields of the first enterprise computing system by the data extraction tool using the distributed first electronic data file, wherein the first cost information is structured based on the predefined cost model;

distributing, to a second enterprise computing system, a second electronic data file that identifies, for use by the data extraction tool, second predefined data source fields within the second enterprising computing system that specify the predefined costs included in the predefined cost model, at least one of the second predefined data source fields specifying a particular predefined cost being different from a predefined data source field of the first enterprise computing system specifying the particular predefined cost, and the predefined costs to be included in an analysis of a total cost of owning the second enterprise computing system;

receiving, from the second enterprise computing system, second cost information based on data automatically extracted from the second predefined data source fields of the second enterprise computing system by the data extraction tool using the distributed second electronic data file, wherein the second cost information is structured based on the predefined cost model;

using the received first and second cost information to determine benchmark total cost of ownership cost information that is structured based on the predefined cost model; and storing the determined benchmark total cost of ownership cost information in a storage device.

18. A system comprising:
a first enterprise computing system;
a second enterprise computing system; and
a computing device to:
  distribute, to the first enterprise computing system, a first electronic data file that identifies, for use by a data extraction tool comprising pre-configured software content, predefined data source fields within the first enterprising computing system that specify predefined costs included in a predefined cost model, the predefined costs to be included in an analysis of a total cost of owning the first enterprise computing system;
  receive, from the first enterprise computing system, first cost information based on data automatically extracted from the predefined data source fields of the first enterprise computing system by the data extraction tool using the distributed first electronic data file, wherein the first cost information is structured based on the predefined cost model;
  distribute, to the second enterprise computing system, a second electronic data file that identifies, for use by the data extraction tool, second predefined data source fields within the second enterprising computing system that specify the predefined costs included in the predefined cost model, at least one of the second predefined data source fields specifying a particular predefined cost being different from a predefined data source field of the first enterprise computing system specifying the particular predefined cost, and the predefined costs to be included in an analysis of a total cost of owning the second enterprise computing system;
  receive, from the second enterprise computing system, second cost information based on data automatically extracted from the second predefined data source fields of the second enterprise computing system by the data extraction tool using the distributed second electronic data file, wherein the second cost information is structured based on the predefined cost model;
  determine, using the received first and second cost information, benchmark total cost of ownership cost information that is structured based on the predefined cost model; and
  store the determined benchmark total cost of ownership cost information in a storage device.

* * * * *